United States Patent
Casasanta, III

(10) Patent No.: US 8,890,354 B2
(45) Date of Patent: Nov. 18, 2014

(54) WIND ENERGY HARNESSING WALL

(75) Inventor: Vincenzo Casasanta, III, Woodinville, WA (US)

(73) Assignee: Empire Technology Development LLC, Wilmington, DE (US)

( * ) Notice: Subject to any disclaimer, the term of this patent is extended or adjusted under 35 U.S.C. 154(b) by 59 days.

(21) Appl. No.: 13/814,996

(22) PCT Filed: May 2, 2012

(86) PCT No.: PCT/US2012/036138
§ 371 (c)(1),
(2), (4) Date: Feb. 8, 2013

(87) PCT Pub. No.: WO2013/165413
PCT Pub. Date: Nov. 7, 2013

(65) Prior Publication Data
US 2013/0292949 A1 Nov. 7, 2013

(51) Int. Cl.
*F03D 11/04* (2006.01)
*F03D 1/04* (2006.01)

(52) U.S. Cl.
CPC .............. *F03D 11/045* (2013.01); *Y02B 10/30* (2013.01); *F03D 11/04* (2013.01); *Y02E 10/728* (2013.01); *F05B 2240/133* (2013.01); *F03D 1/04* (2013.01)
USPC ........................................................ 290/55

(58) Field of Classification Search
CPC ..... Y02E 10/74; F05B 2240/133; G01F 1/44; F03D 1/04
USPC ........................................................ 290/55
See application file for complete search history.

(56) References Cited

U.S. PATENT DOCUMENTS

| | | |
|---|---|---|
| 3,251,226 A | 5/1966 | Cushing |
| 4,151,423 A * | 4/1979 | Hendel ............................ 290/42 |
| 4,348,594 A | 9/1982 | Lipfert |
| 5,750,903 A | 5/1998 | Ryhanen |
| 7,208,845 B2 | 4/2007 | Masters et al. |
| 7,479,709 B2 * | 1/2009 | Hsiung et al. ................... 290/55 |
| 8,269,368 B2 * | 9/2012 | White ............................. 290/55 |
| 8,358,023 B2 * | 1/2013 | West ............................... 290/43 |

(Continued)

FOREIGN PATENT DOCUMENTS

JP     11252893 A     9/1999

OTHER PUBLICATIONS

International Search Report and Written Opinion for International Application PCT/US12/26138 filed May 2, 2012, mailed Sep. 20, 2012.

*Primary Examiner* — Michael Zarroli
(74) *Attorney, Agent, or Firm* — Turk IP Law, LLC

(57) ABSTRACT

Technologies are generally described for a wind energy harnessing device. The device may include a tapered hollow tube and an attached curved tube which may be filled with a fluid. A permeable membrane may be inserted into a constricted inner channel of the hollow tube and may be configured to oscillate in response to incoming airflow through the hollow tube. The fluid in the curved tube may be displaced in response to a pressure differential caused by oscillation of the membrane. Conducting coils may be wound around the attached curved tube, and a magnet suspended within the fluid may oscillate with the fluid between the conducting coils, and may generate a magnetic flux which may induce a voltage in the coils. The coils may be connected to an external power grid for converting the induced voltage into usable electrical energy.

20 Claims, 12 Drawing Sheets

(56) References Cited

U.S. PATENT DOCUMENTS

| | | | |
|---|---|---|---|
| 8,736,098 B2 * | 5/2014 | Choi et al. | 290/55 |
| 2007/0138797 A1 | 6/2007 | Reidy et al. | |
| 2008/0148723 A1 | 6/2008 | Birkestrand | |
| 2008/0217926 A1 | 9/2008 | Lemieux | |
| 2011/0006535 A1 | 1/2011 | Bahari | |
| 2011/0057449 A1 | 3/2011 | Marya et al. | |
| 2011/0083515 A1 | 4/2011 | Phillips | |
| 2011/0133462 A1 | 6/2011 | Pagliasotti | |
| 2011/0135443 A1 * | 6/2011 | Cucci et al. | 415/1 |
| 2012/0141249 A1 * | 6/2012 | Carlson | 415/1 |

* cited by examiner

WIND ENERGY HARNESSING WALL

BACKGROUND

Unless otherwise indicated herein, the materials described in this section are not prior art to the claims in this application and are not admitted to be prior art by inclusion in this section.

Wind energy has been collected during much of human civilization and the most ubiquitous device has been, and continues to be, the windmill. Modern fluid dynamics based design has yielded a vast array of wind turbine designs, however conventional wind turbines are not practical for everyday use in homes and buildings as they are large, cumbersome, may pose safety risks, and thus need to be installed in special environments.

There has also been considerable effort expended in the use of the piezoelectric effect to produce more elegant, compact, and integrated wind energy harvesting. The piezoelectric effect (solid state potential changes that are linearly proportional to applied stress) is observed in ferroelectric ceramics and polymers and is relatively inefficient since it is a cooperative condensed matter phenomenon. Proliferation of piezoelectric wind harvesting devices over a large scale may be impractical due to the intricate micromechanical nature of most conceivable structures.

The present disclosure appreciates that exterior surfaces of building structures such as homes, walls, buildings, bridges and dams, are constantly exposed to wind, however, most of the kinetic energy of wind impacting the structures is retained in the air stream since it is elastically scattered.

SUMMARY

The present disclosure generally describes a wind energy harnessing device, a wind energy harnessing wall, method for converting wind energy into electrical energy through a plurality of wind energy harnessing devices embedded into a wall structure, and a wind energy harnessing wall module for capturing and converting wind energy to electrical energy.

According to some example embodiments, a wind energy harnessing device may include a hollow tube including an intake portion, an outtake portion, and a tapered portion with an inner channel, where the intake portion of the hollow tube has a first diameter, the inner channel has a second diameter, and the outtake portion has a third diameter, where the tapered portion has a first tapered shape with changing diameter extending from the intake portion to the inner channel of the hollow tube and a second tapered shape with changing diameter extending from the inner channel to the outtake portion of the hollow tube; a permeable element affixed transversally in the inner channel and configured such that the permeable element oscillates in response to air passing through the hollow tube; a bent tube including a first end and a second end, where the substantially bent tube is partially filled with a fluid, where the first end is coupled to the air intake portion of the hollow tube and the second end is coupled to the inner channel behind the permeable element such that the fluid moves bi-directionally within the bent tube in response to the oscillation of the permeable element; a magnet suspended within the fluid inside the bent tube, where the magnet is configured to move within the fluid in response to the bi-directional movement of the fluid; and a conductive coil wrapped around an exterior surface of the bent tube, where the conductive coil is configured such that an electric current is generated in response to a movement of the magnet through the conductive coil.

According to other example embodiments, a wind energy harnessing wall may include a wall structure having a first surface and a second surface and a plurality of wind energy harnessing devices embedded into the wall structure with an air intake opening of each device being on the first surface of the wall structure and an output opening of each device being on the second surface of the wall structure. Each device may include a hollow tube including an intake portion, an outtake portion, and a tapered portion with an inner channel, where the intake portion of the hollow tube has a first diameter, the inner channel has a second diameter, and the outtake portion has a third diameter, where the tapered portion has a first tapered shape with changing diameter extending from the intake portion to the inner channel of the hollow tube and a second tapered shape with changing diameter extending from the inner channel to the outtake portion of the hollow tube; a permeable element affixed transversally in the inner channel and configured such that the permeable element oscillates in response to air passing through the hollow tube; a bent tube including a first end and a second end, where the substantially bent tube is partially filled with a fluid, where the first end is coupled to the air intake portion of the hollow tube and the second end is coupled to the inner channel behind the permeable element such that the fluid moves bi-directionally within the bent tube in response to the oscillation of the permeable element; a magnet suspended within the fluid inside the bent tube, where the magnet is configured to move within the fluid in response to the bi-directional movement of the fluid; and a conductive coil wrapped around an exterior surface of the bent tube, where the conductive coil is configured such that an electric current is generated in response to a movement of the magnet through the conductive coil.

According to further example embodiments, a method for converting wind energy into electrical energy through a plurality of wind energy harnessing devices embedded into a wall structure may include embedding the plurality of wind energy harnessing devices into the wall structure with an air intake opening of each device being on an external surface of the wall structure and an output opening of each device being on a surface of the wall structure opposite of the external surface. Each device may include a hollow tube including an intake portion, an outtake portion, and a tapered portion with an inner channel, where the intake portion of the hollow tube has a first diameter, the inner channel has a second diameter, and the outtake portion has a third diameter, where the tapered portion has a first tapered shape with changing diameter extending from the intake portion to the inner channel of the hollow tube and a second tapered shape with changing diameter extending from the inner channel to the outtake portion of the hollow tube; a permeable element affixed transversally in the inner channel and configured such that the permeable element oscillates in response to air passing through the hollow tube; a bent tube including a first end and a second end, where the substantially bent tube is partially filled with a fluid, where the first end is coupled to the air intake portion of the hollow tube and the second end is coupled to the inner channel behind the permeable element such that the fluid moves bi-directionally within the bent tube in response to the oscillation of the permeable element; a magnet suspended within the fluid inside the bent tube, where the magnet is configured to move within the fluid in response to the bi-directional movement of the fluid; and a conductive coil wrapped around an exterior surface of the bent tube, where the conductive coil is configured such that an electric current is generated in response to a movement of the magnet through the conductive coil.

According to yet other example embodiments, a wind energy harnessing wall module may include a prefabricated panel, configured to be attached to a preexisting structure and a plurality of wind energy harnessing devices embedded into the prefabricated panel with an air intake opening of each device being on the first surface of the prefabricated panel and an output opening of each device being on the second surface of the prefabricated panel. Each device may include a hollow tube including an intake portion, an outtake portion, and a tapered portion with an inner channel, where the intake portion of the hollow tube has a first diameter, the inner channel has a second diameter, and the outtake portion has a third diameter, where the tapered portion has a first tapered shape with changing diameter extending from the intake portion to the inner channel of the hollow tube and a second tapered shape with changing diameter extending from the inner channel to the outtake portion of the hollow tube; a permeable element affixed transversally in the inner channel and configured such that the permeable element oscillates in response to air passing through the hollow tube; a bent tube including a first end and a second end, where the substantially bent tube is partially filled with a fluid, where the first end is coupled to the air intake portion of the hollow tube and the second end is coupled to the inner channel behind the permeable element such that the fluid moves bi-directionally within the bent tube in response to the oscillation of the permeable element; a magnet suspended within the fluid inside the bent tube, where the magnet is configured to move within the fluid in response to the bi-directional movement of the fluid; and a conductive coil wrapped around an exterior surface of the bent tube, where the conductive coil is configured such that an electric current is generated in response to a movement of the magnet through the conductive coil.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
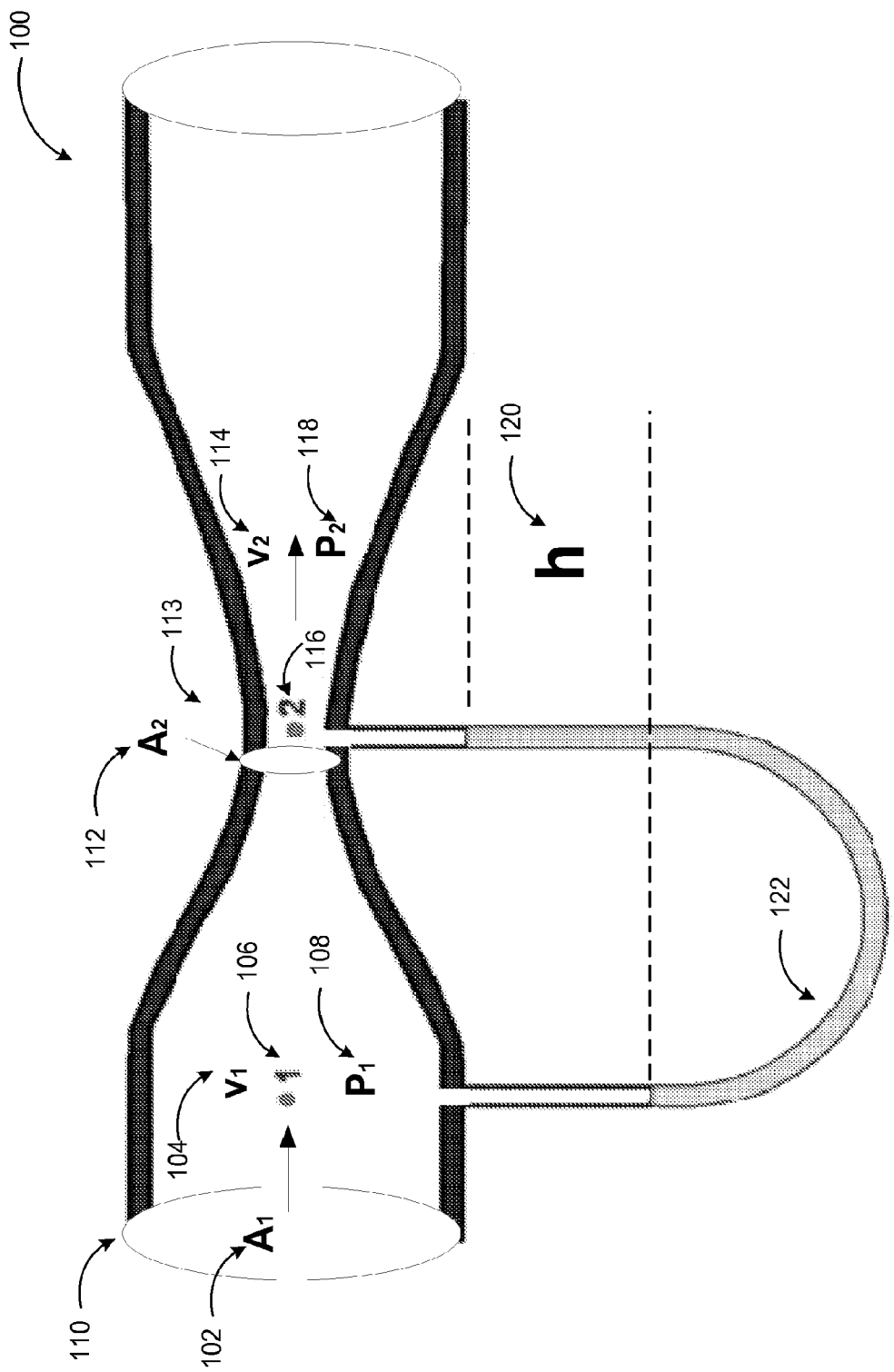
FIG. 1 illustrates an example Venturi tube.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to capturing and converting wind energy into electrical energy utilizing one or more wind energy harnessing devices.

Briefly stated, technologies are described for a wind energy harnessing device and methods. The wind energy harnessing device may include a tapered hollow tube and an attached curved tube which may be filled with a fluid. A permeable membrane may be inserted into a constricted inner channel of the hollow tube and may be configured to oscillate in response to incoming airflow through the hollow tube. The fluid in the attached curved tube may be displaced in response to a pressure differential caused by oscillation of the membrane. Conducting coils may be wound around the attached curved tube, and a magnet suspended within the fluid may oscillate with the fluid between the conducting coils, and may generate a magnetic flux which may induce a voltage in the coils. The coils may be connected to an external power grid for converting the induced voltage into usable electrical energy.

FIG. 1 illustrates an example Venturi tube, where some embodiments may be implemented in accordance with the present disclosure. A wind energy harnessing device for capturing and converting wind energy to electrical energy may take advantage of the Venturi effect. Diagram 100 demonstrates a basic Venturi tube structure as the structure is used in fluid dynamics to take advantage of the Venturi effect. The structure of the Venturi tube may typically include a hollow tube having a substantially hourglass shape, such that the diameter of an entry channel 110 of the Venturi tube may be tapered from the entry channel 110 to an inner channel 113, and thus the entry channel cross sectional surface area 102 may be larger than the inner channel cross sectional surface area 112.

The Venturi effect demonstrates a reduction in fluid pressure that results when a fluid flows from the larger surface area entry channel 110 of the pipe through the constricted or smaller surface area inner channel 113 of the pipe. The Venturi effect is observed due to the varying cross sectional surface areas of the entry channel 110 and the inner channel 113. According to the laws of fluid dynamics, as the fluid passes through the inner channel 113 having a constricted cross sectional surface area 112, the velocity of the fluid increases to satisfy the principle of continuity, while its pressure decreases to satisfy the principle of the conservation of mechanical energy. For example, at an entry channel point 106 the fluid may have an initial velocity $v_1$ 104 and initial pressure $P_1$ 108, and at an inner channel point 116 the fluid may have an exit velocity $v_2$ 114 which is greater than the initial velocity $v_1$ 104 and an exit pressure $P_2$ 118 which is less than the initial pressure $P_1$ 108. An equation for the pressure decrease between the entry channel and the inner channel may be derived from the Bernoulli equation and the continuity equation, and for steady flow of an incompressible, irrotational, nonviscous fluid, such as air having density $\rho_{air}$, through the Venturi tube, the equation for the pressure drop at the inner channel 113 reduces to:

$$P_2 - P_1 = \frac{\rho_{air}}{2}(v_1^2 - v_2^2) \quad [1]$$

The pressure differential that occurs between the entry channel point 106 and the inner channel point 116 can be readily observed using a u-tube manometer 122 attached to the pipe, or Venturi tube. The u-tube manometer 122 may be attached to the pipe such that a first opening of the u-tube manometer 122 is attached at the entry channel 110 and a second opening of the u-tube manometer 122 is attached at the inner channel 113. A fluid, such as water for example, may fill the u-tube manometer 122, and the pressure differential between the entry channel point 106 and the inner channel point 116 may be manifested by the displacement or the height difference 120 of the fluid inside the u-tube manometer 122.

The example Venturi tube demonstrated in diagram 100 and some fluid dynamic and continuity calculations may form the basis for the wind harnessing energy device described according to embodiments. The initial velocity $v_1$ 104 of air entering the entry channel of the pipe can be determined according to the mass continuity equation below:

$$\frac{\partial \rho_{air}}{\partial t} + \rho_{air} \nabla \cdot v = 0 \quad [2]$$

Equation [2] reduces to the simple expression $A_1 v_1 = A_2 v_2$ for steady flow in the Venturi tube. As previously described, the pressure differential between the entry channel 110 and the inner channel 113 may be manifested by the height difference h 120 of the fluid inside the u-tube manometer 122. If the density of the fluid is $\rho$, then the pressure difference is:

$$P_2 - P_1 = \rho g n, \quad [3]$$

where g is the acceleration due to gravity. Equating these expressions [2] and [3] for the pressure differential $(P_2 - P_1)$ and substituting $v_2 = (A_1/A_2) v_1$ allows the initial velocity $v_1$ 104 of air entering the entry channel to be calculated by measuring the displacement or height difference h 120 of fluid in the u-tube manometer 122 attached to a Venturi tube having known entry channel 110 and inner channel 113 diameters. The above calculations form the basis for the wind energy harnessing device according to embodiments. In static conditions, with constant Venturi tube dimensions and constant initial velocity due to a steady input air flow, the pressure differential and the height difference 120 remain constant and no energy can be harnessed since there is no movement in the fluid of the u-tube manometer. In a system according to embodiments, energy may be harnessed from the Venturi tube if the static conditions are altered to enable the pressure differential and thus the the following equation where the membrane 206 is compared to a cantilever fixed at one end:

$$f = \frac{k}{2\pi} \sqrt{\frac{EI}{\rho A L^4}}, \quad [4]$$

where E=Young's modulus of the material, I=moment of inertia of the membrane, Q=density of the membrane, A=area of the cantilever membrane, L=length of the cantilever membrane, and k=constant based on boundary conditions (=3.52 for cantilever fixed at one end). Additionally, the deflection (δ) that the cantilever membrane undergoes during oscillation can be calculated from Stoney's formula as follows:

$$\delta = \frac{3\sigma(1-\eta)}{E}\left(\frac{L}{\tau}\right)^2, \quad [5]$$

where E=Young's modulus of the material, σ=applied stress, η=Poisson ratio of the material, L=length of the cantilever membrane, and τ=thickness of the cantilever membrane.

Based on the formulas [4] and [5] for the resonant frequency and deflection of the membrane 206 during oscillation, the energy which may be harnessed using the hollow tube may be estimated. Due to the series of holes in the membrane 206, the membrane 206 may deflect (δ) in a sinusoidal manner, and thus the effective inner channel surface area 204 for purposes of the above calculations may have a sinusoidal time variation as the membranes deflects (δ) in its sinusoidal manner.

The sinusoidal oscillation of the inner channel surface area 204 may translate to oscillation of the pressure differential between the entry channel 210 and the inner channel 213 of the hollow tube. As a result, the displacement of the fluid within the attached curved tube may oscillate with the oscillating pressure differential between the entry channel 210 and the inner channel 213 of the hollow tube. In an example embodiment which may be described in more detail below, energy may be harnessed by inserting an encapsulated magnet within the fluid of the attached u-tube manometer, and installing wire coils around the u-tube manometer. As the magnet oscillates between the wire coils, the oscillatory motion of the magnet translates into a power generator, whereby a voltage is induced in the coils by the time varying magnetic flux of the oscillating magnet. Faraday's induction Law may quantify the voltage induced in the coils by the time varying magnetic flux of the oscillating magnet:

$$\oint E \cdot dl = -\frac{\partial}{\partial t} \int \int B \cdot dA \quad [6]$$

Figure 2:
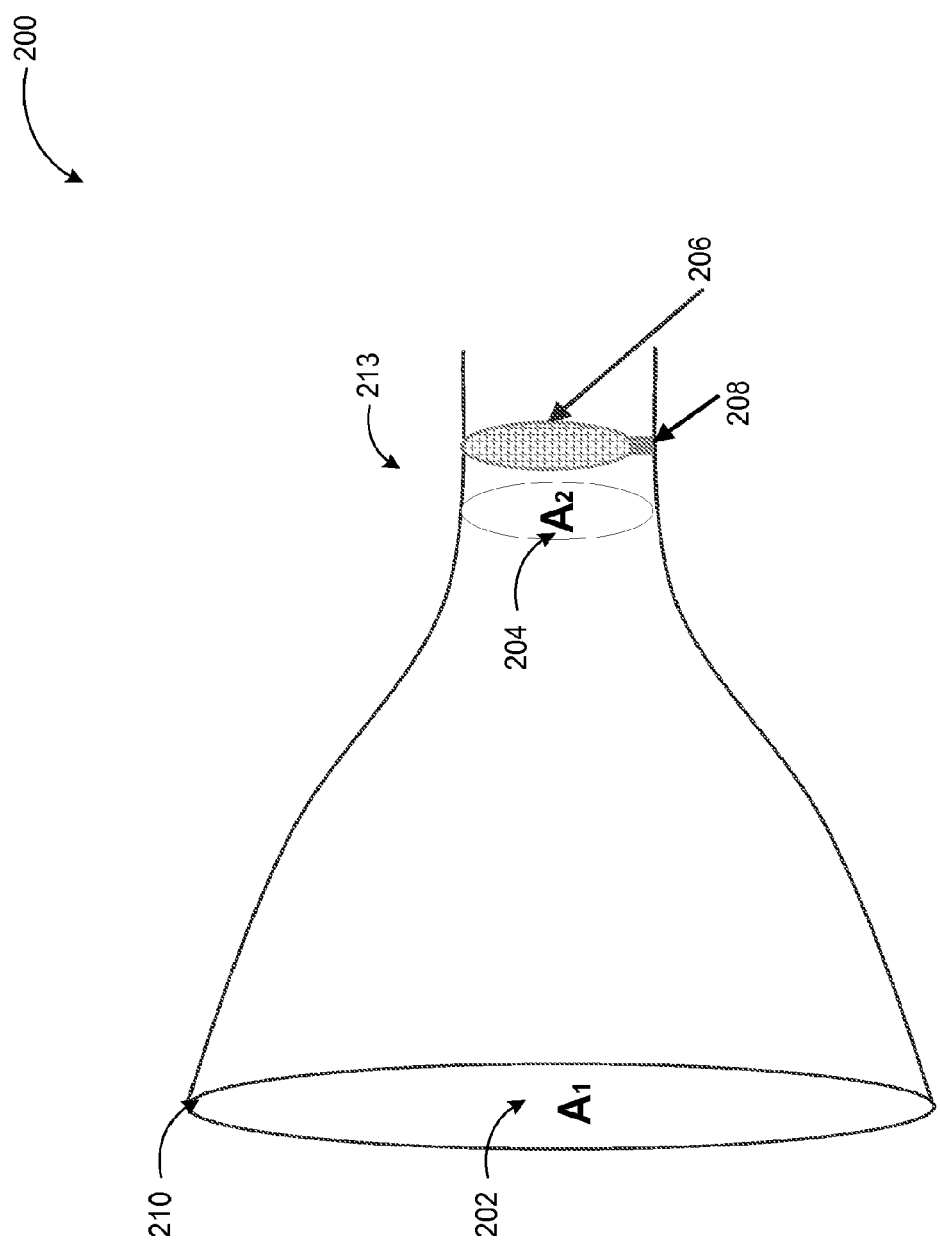
FIG. 2 illustrates an example entry channel and inner channel including an attached membrane of an example wind energy harnessing component.
Figure 3:
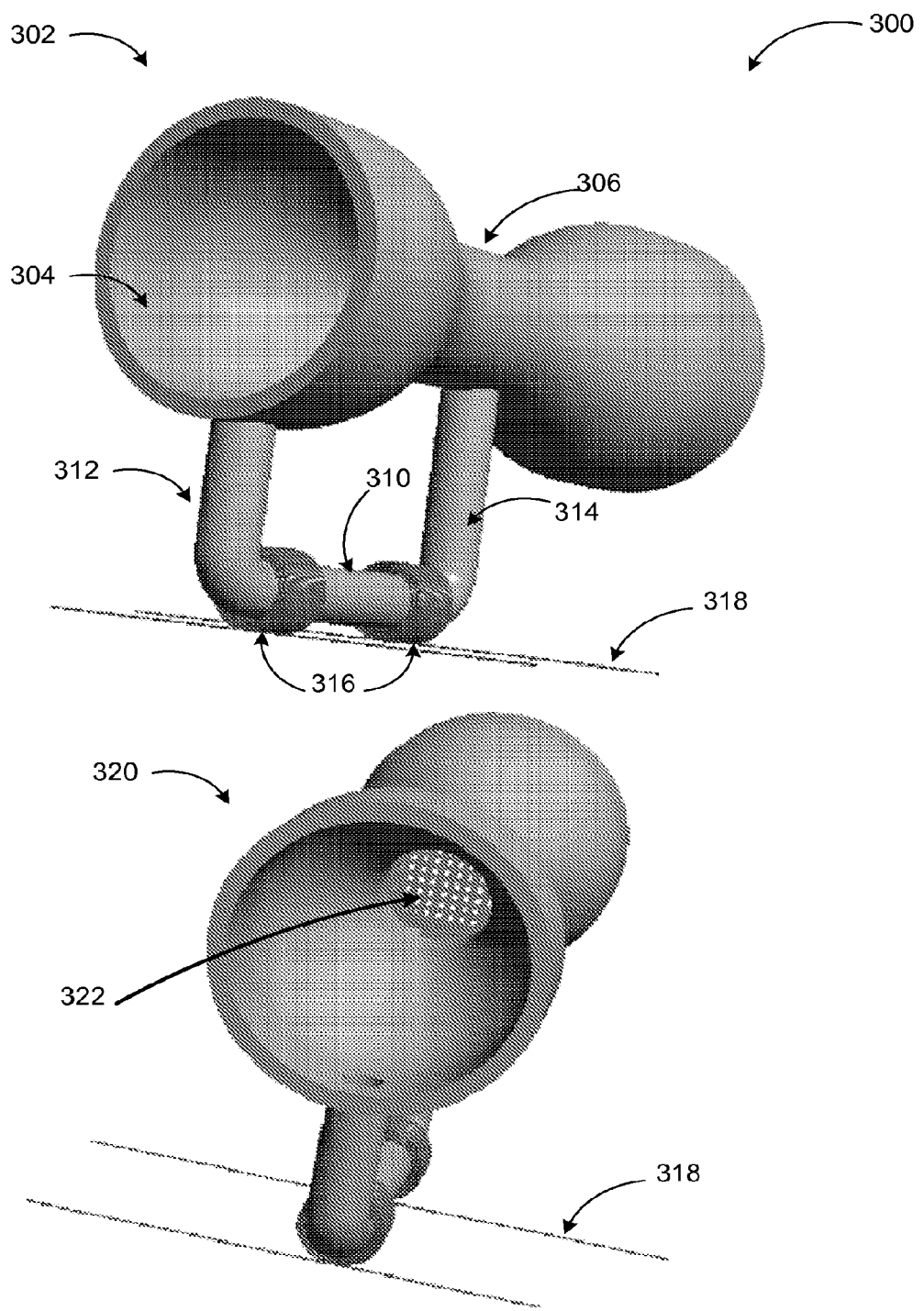
FIG. 3 illustrates example perspective views of a wind energy harnessing component.

FIG. 3 illustrates example perspective views of a wind energy harnessing component, arranged in accordance with at least some embodiments described herein. As previously discussed in conjunction with FIG. 1, a wind energy harnessing component device may be constructed to capture and convert wind energy into electrical energy by taking advantage of the Venturi effect and using the principles and calculations discussed in conjunction with FIG. 2. The wind energy harnessing component 302, according to embodiments, may be constructed using the structural elements of a basic Venturi tube structure as demonstrated in FIG. 1. The wind energy harnessing component 302 may include a hollow tube 305 having a substantially hourglass shape and an attached curved tube 309. The hollow tube 305 may include an entry channel 304 and an inner channel 306, such that the diameter of the entry channel 304 may be tapered from the entry channel 304 to the inner channel 306, thus creating a constricted inner channel cross sectional surface area.

The curved tube 309 may be coupled with the hollow tube 305, such that a first opening 312 of the curved tube 309 may be attached near the entry channel 304 of the hollow tube 305 and a second opening 314 of the hollow tube 309 may be attached at the inner channel 306 of the hollow tube 305. The curved tube 309 may have a substantially curved and/or u-shape, such that the first opening 312 and second opening 314 are positioned above the lower middle section 310 of the curved tube 309, and the lower middle section 310 may have a substantially flat shape. In another embodiment, the lower middle section 310 may have a substantially curved shape. The curved tube 309 may be filled with a fluid, such as water for example, which may be enabled to move bi-directionally within the curved tube 309 in response to the pressure differential between the entry channel 304 and the inner channel 306 as air or wind moves through the hollow tube 305. Additionally, a magnet may be inserted within the fluid inside the lower middle section 310 of the curved tube 309, and the magnet may be enabled to move freely with the fluid as it moves bi-directionally within the curved tube 309 in response to the pressure differential.

In an additional embodiment, a permeable membrane 322 may be affixed inside the hollow tube 305 on the interior surface of the inner channel 306. The permeable membrane 322 may be affixed at one or more points, thus enabling the permeable membrane to freely move or oscillate in response to incoming air flow through the hollow tube 305. As discussed previously in conjunction with FIG. 2, the permeable membrane 322 may include a plurality of perforations or holes which may enable the membrane 322 to oscillate with an incoming air flow from the entry channel 304 to the inner channel 306. The oscillations of the membrane 206 due to the incoming air flow may cause the inner channel surface area 304 to oscillate and as a result, the fluid in the attached curved tube 309 may correspondingly oscillate. As the fluid in the attached curved tube 309 oscillates, the magnet suspended within the fluid may also oscillate within the lower middle section 310 of the curved tube 309.

In a further embodiment, one or more conducting coils 316 may be placed around the exterior surface of the lower middle section 310 of the curved tube 309. For example, one conducting coil may be positioned around a first end of the lower middle section 310 and a second conducting coil may be positioned around a second end of the lower middle section 310. In additional embodiments, a single large coil may be wound along the curved tube 309 and in other embodiments a plurality of conducting coils may be placed around the curved tube 309. The conducting coils 316 may be configured to collect a current which may be induced when the magnet moves between the coils inside the lower middle section 310 of the curved tube 309. As the magnet is moved into the coils 316 by the oscillation of the fluid, a magnetic flux may be generated between the coils and the time rate of change in the magnetic flux may generate a voltage or an electromotive force (emf) in the conducting coils 316. The conducting coils 316 may be attached to wires 318, which may collect the generated current and voltage, and may provide the current and voltage to an external power grid for harnessing the electrical energy.

In a system according to some embodiments, the wind energy harnessing component including the hollow tube and the curved tube may be constructed of a sturdy building material such as plastic, metal, and/or fiberglass. Other similar composite materials may also be used to construct the exterior shell of the wind energy harnessing component. The wind energy harnessing component may be attachable to a separate building structure such as a wall or other similar structure, such that the wind energy harnessing component is a separate and distinct component from the structure.

Moreover, one or more wind energy harnessing components may be attached to a lightweight panel, which may be attachable to a separate building structure such as a wall or other similar structure. The lightweight panel may be, for example, a fabric, plastic, sheet metal, nylon and/or fiberglass panel. The lightweight panel may be supported within a housing frame for providing structural support and the housing frame may be attachable to an external surface of the separate building structure. The one or more wind energy harnessing components may be attached to the lightweight panel in a movable fashion, such that each wind energy harnessing component may be positioned and rotated in order to maximize incoming air flow into the entry channel of the wind energy harnessing component. For example, if the cross sectional surface of the entry channel is positioned such that it is perpendicular to an incoming air flow, then maximum air flow may enter the entry channel and the wind energy harnessing component may maximize the amount of captured air flow energy it can convert into electrical energy.

In a further embodiment, the wind energy harnessing component may be embedded within a wall structure during construction of the wall structure, such that the wind energy harnessing component is constructed as a permanent component of the wall structure. In yet another embodiment, the wind energy harnessing component may be embedded within a pre-fabricated wall structure component, such that the wind energy harnessing component is formed within the pre-fabricated wall structure as a cavity within the building material of the pre-fabricated wall structure and the building material of the pre-fabricated wall structure may form the external housing of the wind energy harnessing component.

Figure 4A:
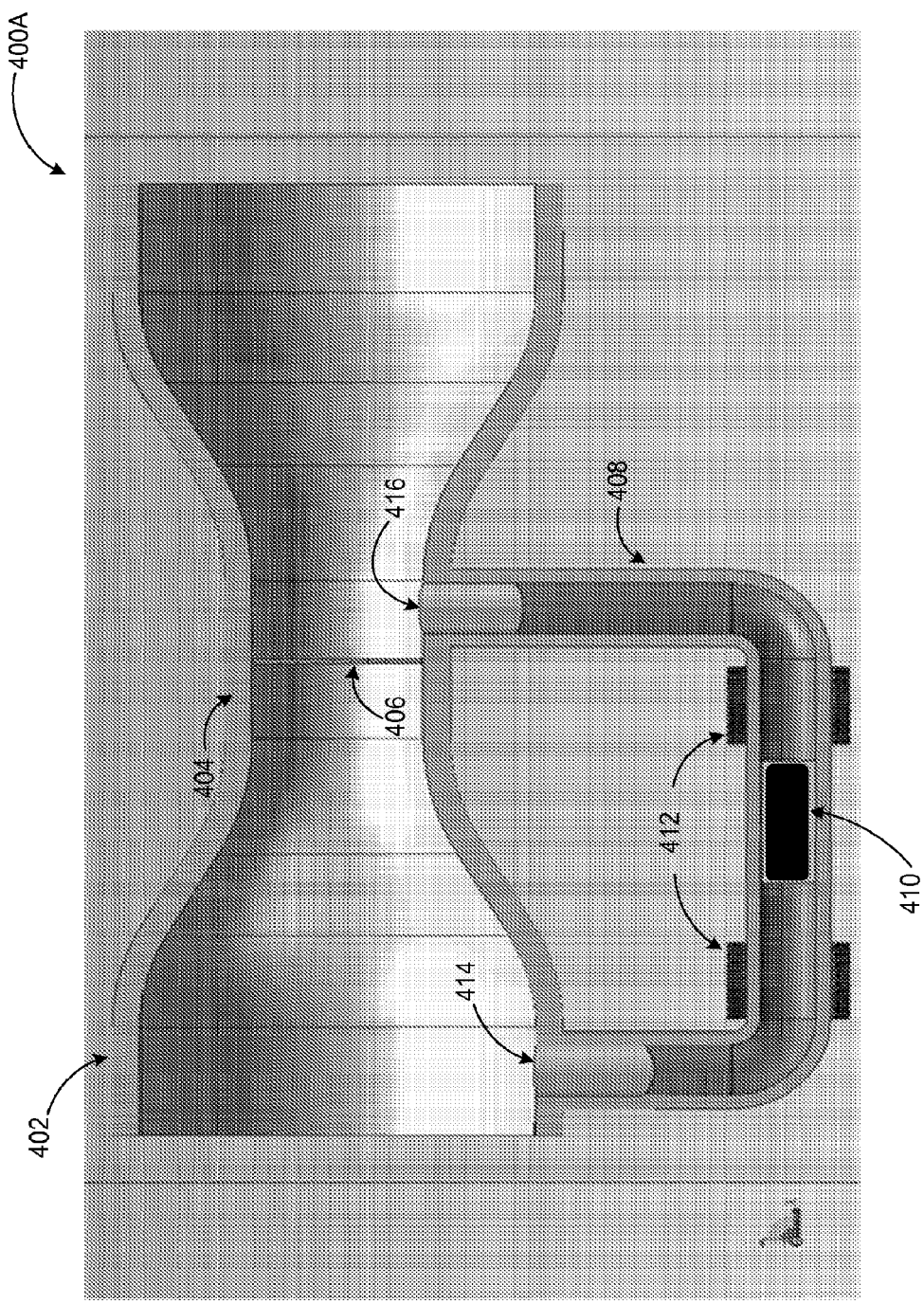
FIGS. 4A and 4B illustrate cross-sectional views of a wind energy harnessing component.
Figure 4B:
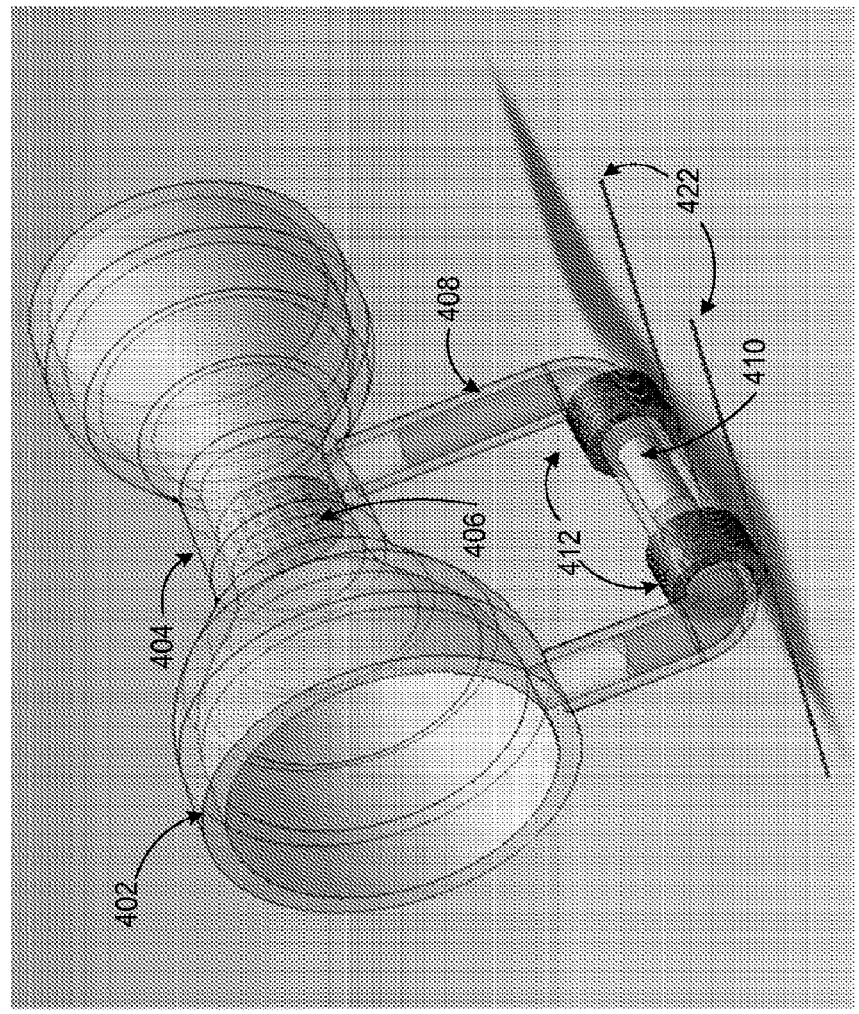

FIGS. 4A and 4B illustrate cross-sectional views of a wind energy harnessing component, arranged in accordance with at least some embodiments described herein. As demonstrated in diagrams 400A and 400B, the wind energy harnessing component may include an elongated hollow tube having a substantially hourglass shape such that an entry channel 402 has a substantially larger diameter than an inner channel 404 of the hollow tube. The hollow tube may be tapered from the larger diameter entry channel to the smaller diameter inner channel 404. Thus, a cross sectional surface area of the entry channel 402 may be larger than the constricted cross sectional surface area of the inner channel 404. The entry channel 404 may be configured to receive incoming air flow, such as wind for example, and as the air flows through the hollow tube, the velocity of the air flow may increase as the air flows through the inner channel of the hollow tube, according to fluid dynamics principles previously discussed above.

The hourglass shaped hollow tube may include a permeable membrane 406, which may be attached at one or more points on the interior surface of the inner channel 404 of the hollow tube. The permeable membrane 406 may be configured to move freely in response to incoming air flow through the inner channel 406 of the hollow tube. In an example embodiment, the permeable membrane 406 may be constructed of a flexible material such as plastic, rubber, flexible metal and/or fiberglass. Additionally, the permeable membrane 406 may be perforated with holes enabling the incoming air flow to flow across the membrane causing the permeable membrane 406 to oscillate with an incoming air flow from the entry channel to the inner channel. The oscillations of the permeable membrane 406 due to the incoming air flow may cause the inner channel surface area to oscillate as a result.

In a further embodiment, the wind energy harnessing component may also include an additional hollow curved tube 408, which may be attached to the underside of the hourglass shaped hollow tube such that an opening at the first end 414 of the hollow curved tube 408 may be attached at the entry channel 402 of the hollow tube. An opening at the second end 416 of the hollow curved tube 408 may be attached at the inner channel 404 of the hollow tube. The hollow curved tube 408 may be filled with a fluid 418 such as water for example, which may be enabled to flow freely within the hollow curved tube 408. As described previously, the displacement or the height difference of the fluid 418 within the hollow curved tube 408 may reflect the pressure differential between the entry channel 402 and the inner channel 404. As the permeable membrane 406 oscillates with incoming air flow from the entry channel to the inner channel, the oscillations of the permeable membrane 406 may cause the inner channel surface area to oscillate as a result. The oscillation of the inner channel surface area may translate to an oscillatory pressure differential between the inner channel 404 and entry channel 402 of the hollow tube. The pressure differential oscillations may produce an oscillatory displacement of the fluid 418 in the coupled hollow curved tube 408 reflecting the oscillating pressure differential.

In some embodiments, the kinetic energy of the oscillatory displacement of the fluid 418 within the hollow curved tube 408 may be harnessed by suspending a magnet 420 within the fluid of the attached hollow curved tube 408 and winding conducting coils 412 around the hollow curved tube 408. As the fluid oscillates due to the oscillation of the inner channel surface area and the resulting oscillatory pressure differential between the inner channel 404 and entry channel 402 of the hollow tube, the magnet 420 may also oscillate between the conducting coils 412. The oscillatory motion of the magnet 420 may induce a time varying magnetic flux between the conducting coils 412, whereby according to established laws of electricity and magnetism, the changing magnetic field may produce a voltage in the conducting coils causing an electrical current to flow in the conduction coils 412. The voltage may be the induced electromotive force, which as described above in conjunction with FIG. 2 may be quantified by Faraday's law of induction. According to example embodiments, the conducting coils may be connected to wires 422 which may be attached to an external power grid. The voltage and electric current induced in the conducting coils 412 may be harnessed and transmitted to the external power grid over the attached wires 422 for producing electrical energy.

In an example embodiment, the magnet 420 may be encapsulated in a coating material, which may enable the magnet 420 to move freely within the hollow curved tube 420. For example, the encapsulating material may have surface tension properties that may create a moderate seal with the interior surface of the hollow curved tube 408, which may enable the magnet to move freely with little friction within the interior of the hollow curved tube 408. The magnet may be encapsulated or sealed in a coating such as a Teflon coating, and additionally the encapsulating material may have hydrophobic properties, which may enable the magnet to move freely with the surrounding fluid, with a minimal amount of friction with the interior surface of the hollow curved tube 408. Additionally, the encapsulated magnet 420 may have a cylindrical cross sectional shape for facilitating friction-free movement within the hollow curved tube 408 as the fluid 418 oscillates. In an example scenario, the free motion of the magnet within the hollow curved tube may resemble the motion of a piston. Further, the magnet 420 may be composed of a high magnetic strength material such as NeFeB or other similar strong magnetic material.

Figure 5:
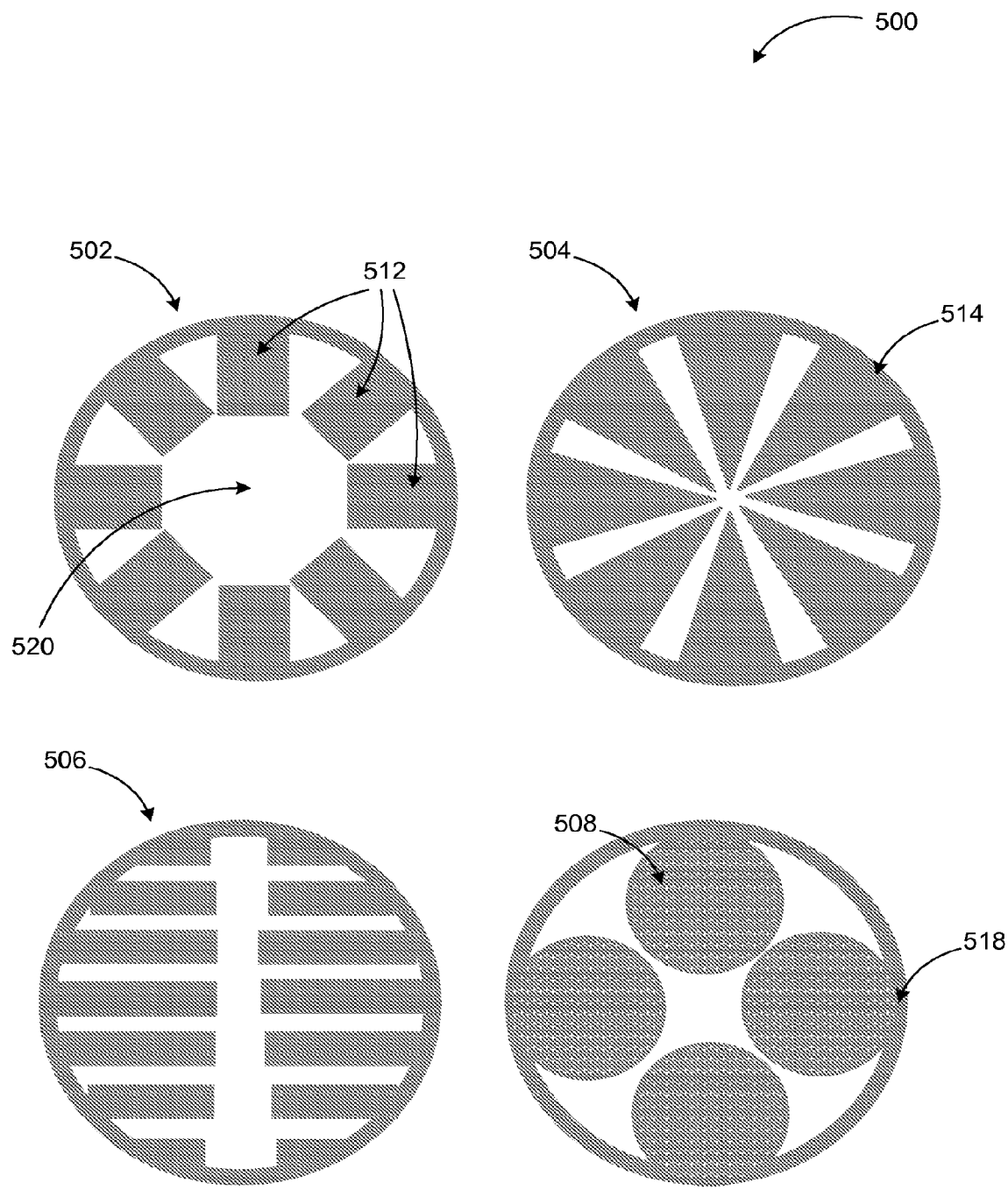
FIG. 5 illustrates example membranes inserted within a wind energy harnessing component.

FIG. 5 illustrates example membranes inserted within a wind energy harnessing component, arranged in accordance with at least some embodiments described herein. In a system according to embodiments, one or more permeable membranes may be affixed transversally on the interior surface of the inner channel of the hollow tube. The permeable membranes may be configured to freely oscillate in response to an incoming air flow through the hourglass shaped hollow tube. As previously discussed, when the incoming air flow impacts the permeable membrane in the inner channel, it may have the effect of vibrating the permeable membrane, and the vibrating or oscillating permeable membrane may have the effect of producing an oscillatory inner channel surface area. The oscillatory inner channel surface area may cause fluid in an attached u-shaped or curved tube to be displaced in an oscillatory manner, which oscillatory motion may be kinetic energy which may be harnessed and converted to electrical energy as previously discussed.

In an example embodiment, the permeable membrane may be affixed to the interior surface at a single location such that it may be fixed at one point 514, 518 resembling a cantilever, and the remaining edges of the permeable membrane may be enabled to freely move upon impact of an air flow. Additionally, the permeable membrane may be affixed to the interior surface of the inner channel at two or more locations, while still being configured to freely oscillate upon an impact of an incoming air flow.

In some embodiments, a single permeable membrane may be inserted within the inner channel, and the shape of the permeable membrane may match the cross sectional shape of the inner channel of the hollow tube such that the surface area of the permeable membrane may substantially equal the surface area of the inner channel. Moreover, the shape of the permeable membrane may take on a variety of other geometries 512, 514, 508 such that the permeable membrane resembles an elongated flap, and the profile may not substantially match the interior profile and shape of the inner channel. Further, a plurality of permeable membranes 512 may be affixed in series to the interior surface of the inner channel, such that each permeable membrane may be affixed to the interior surface at one or more locations, and each permeable membrane in series may be enabled to freely oscillate upon impact of air flow.

In a further embodiment, the permeable membrane may be perforated with a series of holes 508 to allow air to flow across the permeable membrane. The series of holes 508 may enable the permeable membrane to oscillate in response to an incoming air flow such that the effective surface area of the inner channel may vary in a sinusoidal manner. Additionally, the permeable membrane may be composed of a flexible material, which may include for example plastic, rubber, metal and or fiberglass materials. Further, the shape, size, and material of the permeable membrane may be varied and customized in order to achieve a desired resonance frequency of the permeable membrane, a desired deformation and/or deflection of the permeable membrane, and a desired resonance quality factor (Q).

Figure 6:
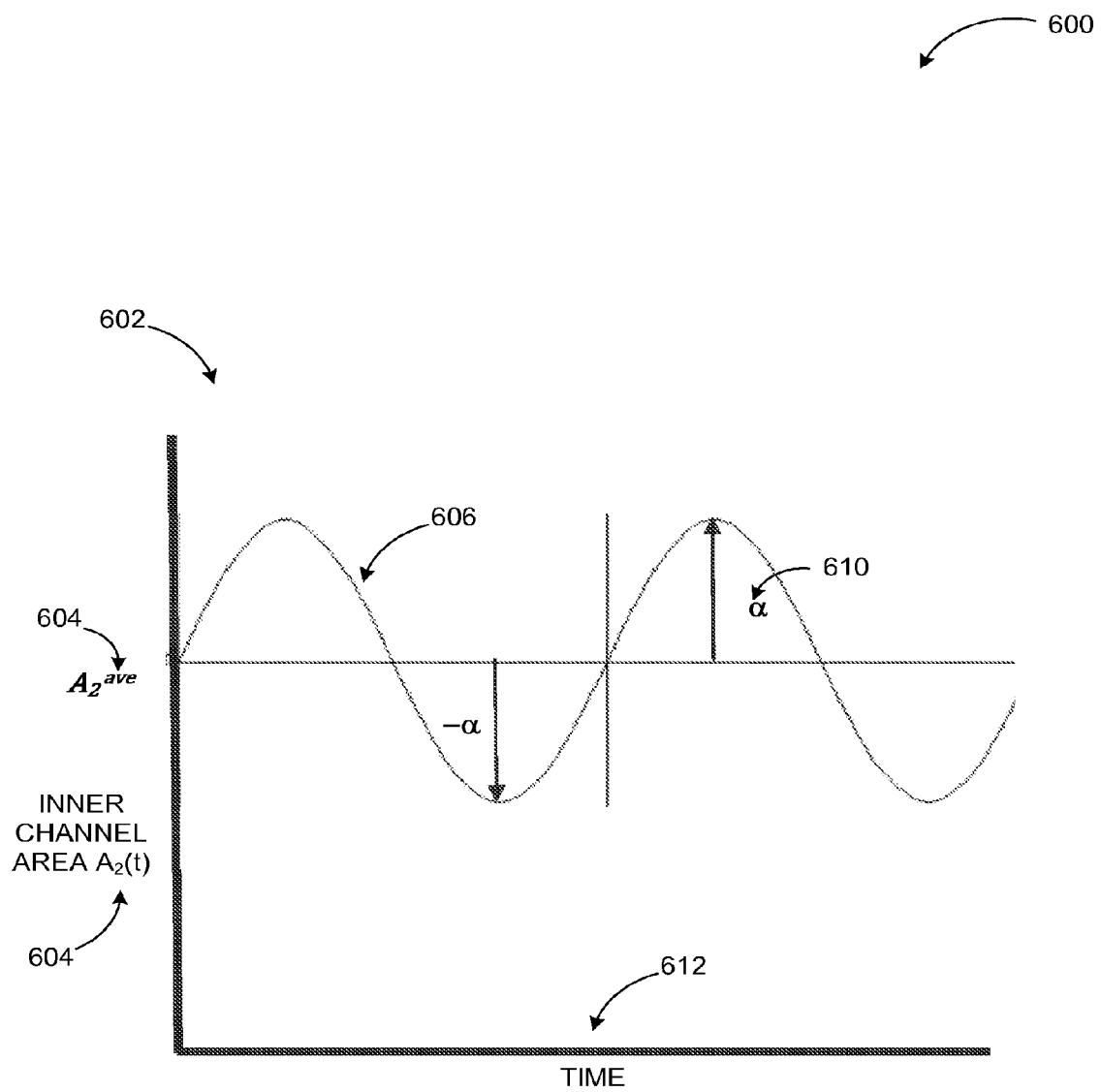
FIG. 6 illustrates an example graph of variation of the inner channel area of a wind energy harnessing component over time.

FIG. 6 illustrates an example graph of variation of the inner channel area of a wind energy harnessing component over time in diagram 600, arranged in accordance with at least some embodiments described herein. In order to predict the voltage which may be generated by the wind energy harnessing component, a series of calculations based on the Bernoulli equation and the continuity equation may be required. The displacement and frequency of the displacement of the fluid within the attached curved tube and the time variation of the oscillating inner channel surface area may provide the basis for the calculations. As previously discussed, the height differential of the fluid in the attached curved tube may reflect the pressure differential between the entry channel and inner channel of the hollow tube, which may be demonstrated as follows:

$$\rho g h = \frac{\rho_{air}}{2}(v_1^2 - v_2^2) \quad [7]$$

In static conditions, such as in a hollow tube without an oscillating permeable membrane, $A_1 v_1 = A_2 v_2$, is a constant. In a hollow tube with an oscillating permeable membrane according to embodiments, the inner channel surface area, $A_2$, may vary with time according to the resonance of the permeable membrane ($A_2(t)$ 604), which may be illustrated as follows:

$$A_2(t) = A_2^{ave} + \alpha \sin(\omega t), \quad [8]$$

where $\alpha$ 610=the induced area change maximum (modulus) caused by the fluttering or oscillation of the permeable membrane, $\omega = 2\pi f$=the circular frequency transcribed by the resonance of the membrane, and $A_2^{ave}$ 608=the time average area of the inner channel of the hollow tube. The time variation of the oscillating surface area of the inner channel $A_2(t)$ 604 may be illustrated by the graph 602 demonstrated in diagram 600 of the oscillating surface area of the inner channel $A_2(t)$ 604 plotted over time 612.

Further, the velocity of the air flow through the inner channel may be $v_2 = A_1 v_1 / A_2$ which substituting $A_2$ with the time variation of the oscillating surface area of the inner channel $A_2(t)$ 604 may be expressed as:

$$v_2 = \frac{A_1}{A_2^{avg} + \alpha \sin(\omega t)} v_1 \quad [9]$$

Figure 7:
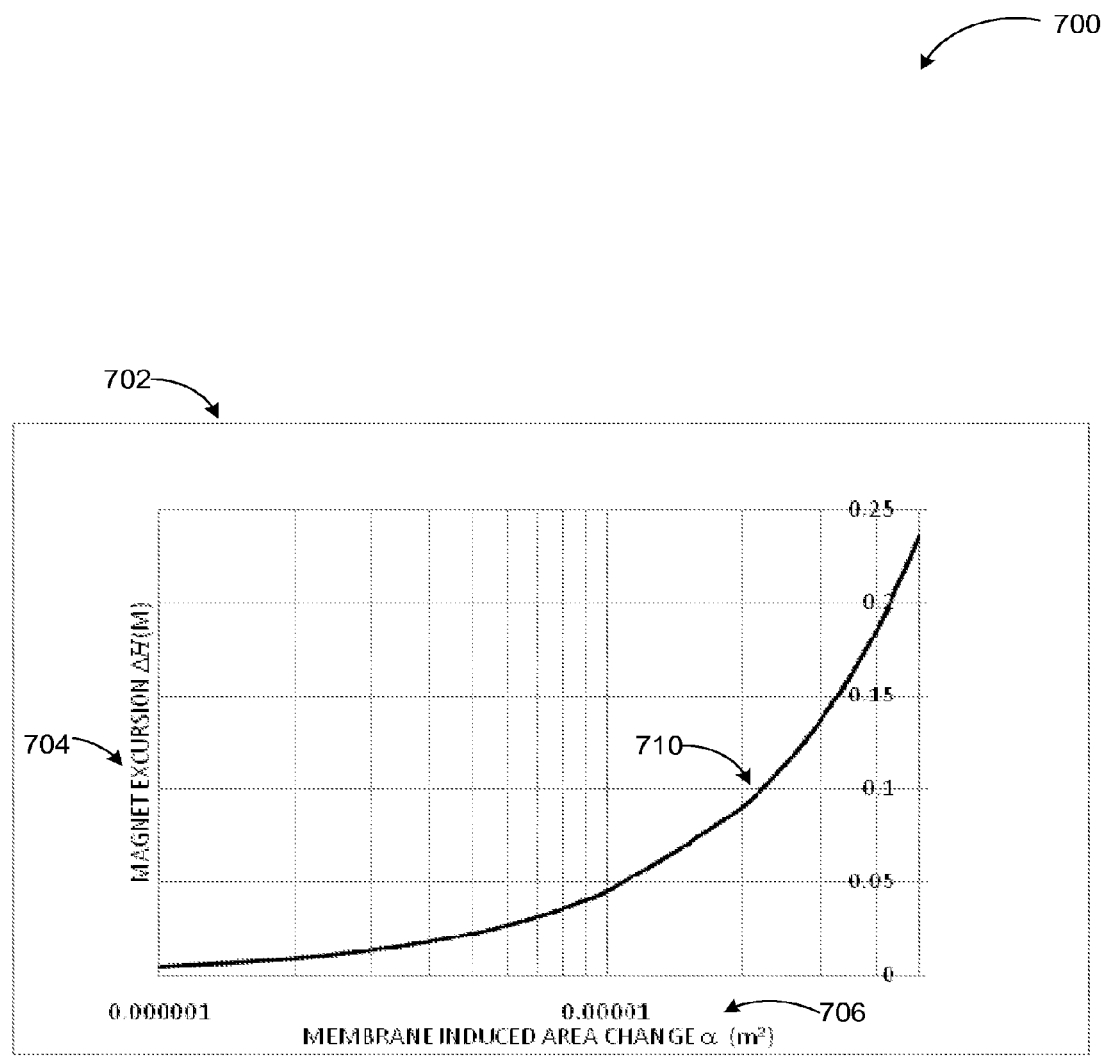
FIG. 7 illustrates an example graph of magnet excursion against a membrane induced area change of the inner channel of a wind energy harnessing component.

FIG. 7 illustrates in diagram 700 an example graph of magnet excursion against a membrane induced area change of the inner channel of a wind energy harnessing component, arranged in accordance with at least some embodiments described herein. In order to estimate the amount of work done on the fluid in the curved tube and thus the available energy for harnessing and converting to electrical energy, a magnitude of the excursion in the curved tube may be calculated. The magnitude of the excursion may be the total distance traversed when the fluid (e.g., water) containing the magnet is displaced from and back to a mean position in an oscillating motion.

If the attached curved tube is filled with water, then using the expression for the velocity of the air flow velocity of the air flow through the inner channel, $v_2$, and the expression for the pressure differential between the entry channel and inner channel of the hollow tube, and solving for h, the oscillatory displacement of the water containing the magnet in the curved tube may be expressed as:

$$h(t) = \frac{\rho_{air} v_1^2}{2g \rho_{water}} \left[ \frac{A_1^2}{(A_1^{avg} + \alpha \sin(\omega t))^2} - 1 \right] \quad [10]$$

The $\sin(\omega t)$ term varies between −1 and +1 and this range $\Delta h = h(\omega t = \pi/2) - h(\omega t = -\pi/2)$ can be expressed for the oscillatory displacement of the water containing the magnet in the curved tube as:

$$\Delta h = \frac{\rho_{air} v_1^2}{2g \rho_{water}} \frac{4 \alpha A_1^2 A_2^{avg}}{\left(\left\{A_2^{avg^2} - \alpha^2\right\}\right)^2} \quad [11]$$

The graph 702 in diagram 700 illustrates a plot 710 of the fluid and magnet excursion $\Delta h$ 704 or total oscillatory displacement within the curved tube over the membrane induced area change $\alpha$ 706. In order to estimate the magnitude of the magnet excursion $\Delta h$ 704 within the curved tube, suitable macroscopic practical values may be assumed for purposes of the calculation. For example, $v_1$ an estimated incoming air flow into the hollow tube, may be 3 m/sec which is an 11 km/hour wind speed. $A_1$ the cross sectional surface area of the entry channel of the hollow tube may be 78.5 cm² which represents a 10 cm diameter entry channel, and $A_2^{ave}$, the average surface area of the oscillating inner channel may be 3.14 cm², which represents a 2 cm diameter inner channel. The values illustrated by the plot 710 show that at the lower end of the membrane induced area change ($\alpha \sim 1$ mm²), the fluid and thus the magnet undergoes an excursion $\Delta h$ 704 of approximately 4 mm in the curved tube. At a higher end of the membrane induced area change ($\alpha \sim 10$ mm²), the fluid and thus the magnet undergo an excursion $\Delta h$ 704 of approximately 4 cm.

Figure 8:
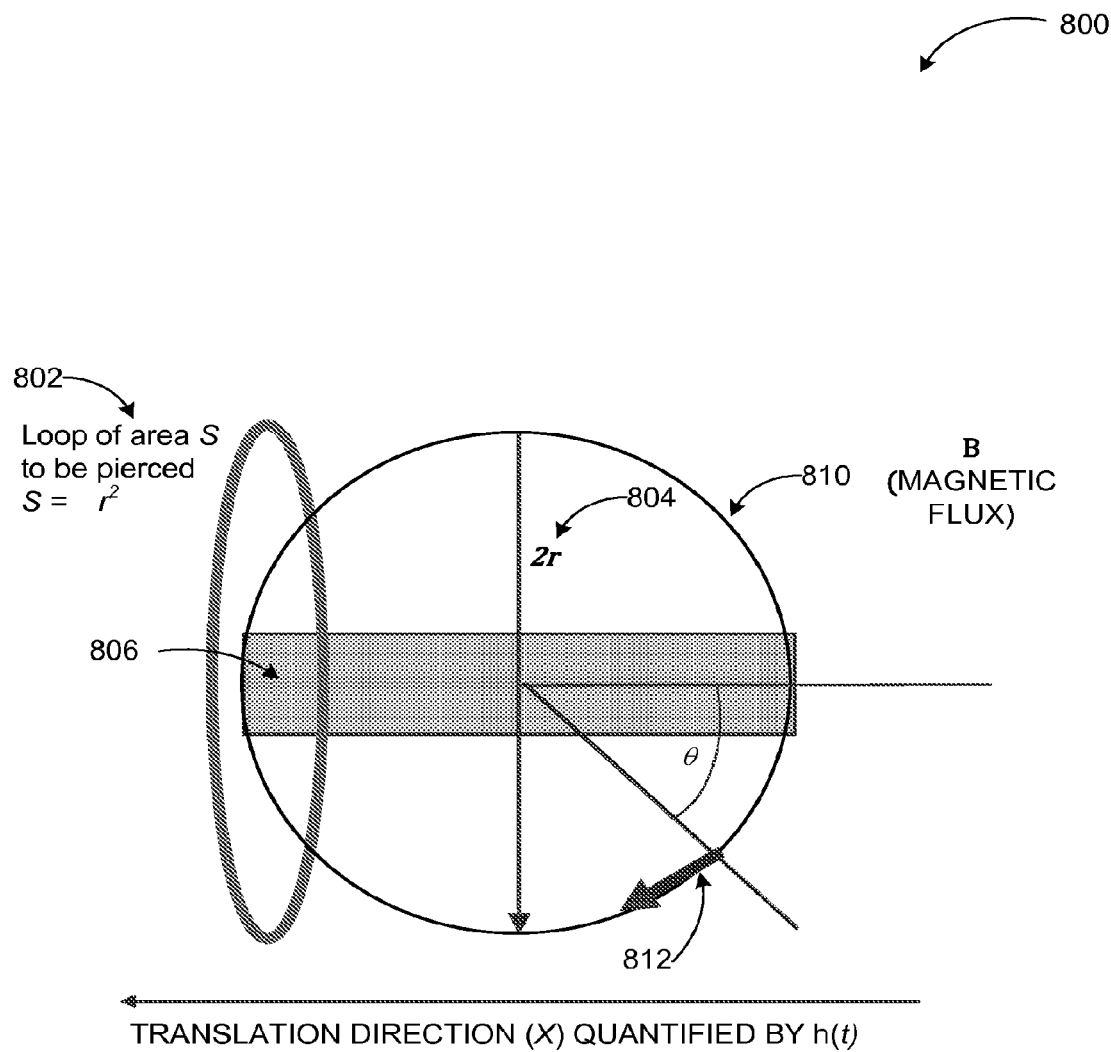
FIG. 8 illustrates example magnetic flux estimation due to magnet oscillation in a wind energy harnessing component.

FIG. 8 illustrates in diagram 800 example magnetic flux estimation due to magnet oscillation in a wind energy harnessing component, arranged in accordance with at least some embodiments described herein. Based on the above estimations of the fluid and magnet excursion $\Delta h$ or total oscillatory displacement of the magnet within the curved tube of a wind energy harnessing component, the induced current and emf in the conducting coils may be estimated. As the magnet oscillates with the fluid between the conducting coils wrapped around the curved tube, a magnetic flux may be generated in the conducting coils, and the time rate of change in the magnetic flux may generate a voltage or an electromotive force (emf). A model of magnetic flux lines due to translation of the magnet 806 through a closed loop 802, which may represent the conductive coils around the curved tube, may illustrate that some of the flux lines that pierce the area of the closed loop 802 may have a circular profile 810 in two dimensions. Based on the observed circular profile of the magnetic flux, for the translation of the magnet through a coil of area S (where $S = \pi r^2$) and N turns, the voltage generated is:

$$V = NS \frac{\partial B_x}{\partial t}, \quad [12]$$

where $B_x$ represents the magnetic field in the x-direction since only the vector components of B in the x-direction may contribute to the flux through the loop. For a given translation and magnetic flux magnitude ($B_o$) through the loop, the $B_x$ component value may be:

$$B_x = B_o \cos\theta = B_o \frac{h(t)}{r} = B_o \sqrt{\frac{\pi}{S}} h(t) \qquad [13]$$

which allows the voltage to be expressed as follows:

$$V(t) = NB_o \sqrt{\pi S} \frac{\partial h(t)}{\partial t} \qquad [14]$$

Using the expression for h(t), or the oscillatory displacement of the water containing the magnet in the curved tube determined above, combined with the above voltage expression, the expression for h(t) may be rewritten as follows:

$$V(t) = \frac{\rho_{air} v_1^2}{g \rho_{water}} A_1^2 NB_o \sqrt{\pi S} \frac{\alpha \omega \cos(\omega t)}{(A_2^{avg} + \alpha \sin(\omega t))^3} \qquad [15]$$

As previously discussed, the range of the sin(ωt) term and cos(ωt) terms may vary between −1 and +1, and therefore the V(t) quantity may be evaluated at four major points of the phasor. At ωt=0 and ωt=π, V(t)=0. At ωt=±π/2, the voltage may be as follows:

$$V(t) = \pm \frac{\rho_{air}}{g \rho_{water}} \frac{A_1^2}{(A_2^{avg})^3} v_1^2 \sqrt{\pi S} NB_o \alpha \omega \qquad [16]$$

This expression may be arranged to:

$$V(t) = \pm \frac{\rho_{air}}{g \rho_{water}} \left[ \frac{A_1}{A_2^{avg}} \right]^2 v_1^2 \sqrt{\pi S} NB_o \frac{\alpha}{A_2^{avg}} \omega \qquad [17]$$

in order to recognize that the Venturi effect of the hollow tube may be based on the ratio of the entry channel surface area to the inner channel surface area ($A_1/A_2$) (represented by K) and the ratio of the membrane induced area change to the inner channel surface area ($\alpha/A_2$) (R), the voltage expression may be expressed as:

$$V(t) = \pm \frac{2\pi \rho_{air}}{g \rho_{water}} K^2 v_1^2 \sqrt{\pi S} NB_o Rf, \qquad [18]$$

where f represents the frequency of the oscillation of the permeable membrane in cycles per second.

Based on the relation [18], it may be observed that the peak voltage produced by the wind energy harnessing component may be a function of the permeable membrane oscillation frequency (f) and amplitude. It may also be observed that the voltage increases as the ratio of the entry channel surface area to the inner channel surface area ($A_1/A_2$) increases, such that design of a wind energy harnessing component with larger entry channels in conjunction with smaller inner channels may produce larger voltages Further, the squared dependence on the input wind velocity ($v_1$) demonstrates the efficiency of the wind energy harnessing component whereby a large voltage may be induced with a relatively lower input wind velocity.

Figure 9:
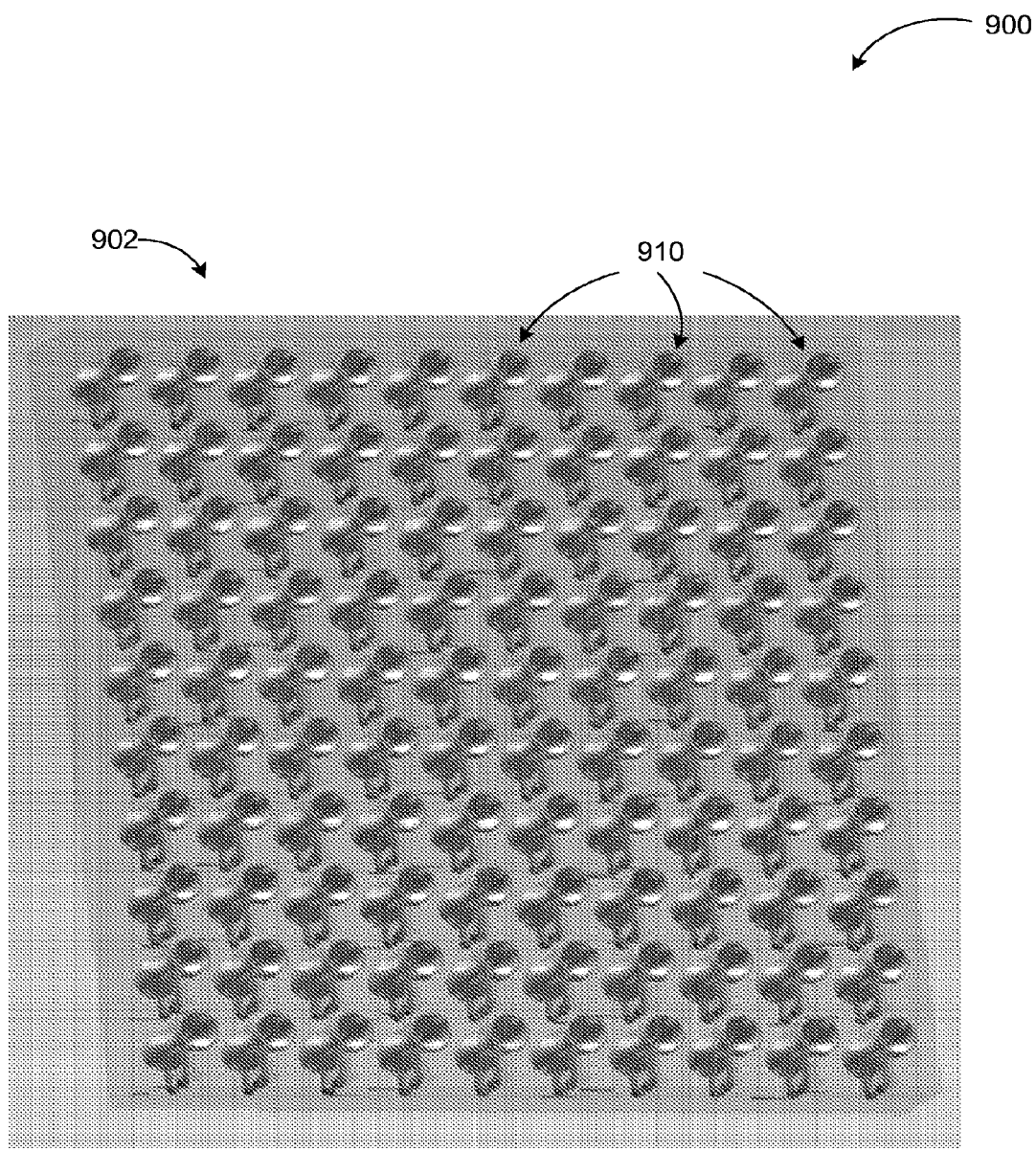
FIG. 9 illustrates an example wall structure embedded with a plurality of wind energy harnessing components.

FIG. 9 illustrates in diagram 900 an example wall structure embedded with a plurality of wind energy harnessing components, arranged in accordance with at least some embodiments described herein. Using the above determined voltage expression, an induced voltage, V(t), in a single wind energy harnessing component 910 may be estimated. Using the following approximate practical values: K=10 (where the entry channel surface area $A_1$=10 cm$^2$ and the inner channel surface area $A_2$=1 cm$^2$), $v_1$=15 km/hour input wind speed, S=3.1416 cm$^2$ (where the diameter of the coil=2 cm), N=100 coil windings, $B_o$=0.25 Tesla (a normal NeFeB magnet), R=1%, and f=5 membrane vibrations per second, the induced voltage, V(t), in a single wind energy harnessing component may be 0.17 Volts. Thus, a wall 902 populated with a plurality of wind energy harnessing components 910 such as a 10×10 array of wind energy harnessing components may conservatively produce 17 volts.

Using the voltage expression [18], some simple manipulation may demonstrate that an increase of the membrane induced area change to 2% doubles the voltage on the wall populated with 100 wind energy harnessing components to 34 volts, and increasing the area ratio K to 15 produces 38 volts. The wall 902 may be populated with any number of wind energy harnessing components, which may be attached to or embedded within the pre-existing wall structure as previously discussed in conjunction with FIG. 3. Additionally, the wall structure may be connected to an external power grid which may harness the induced voltage from the plurality of wind energy harnessing components for producing usable electrical energy.

Figure 10:
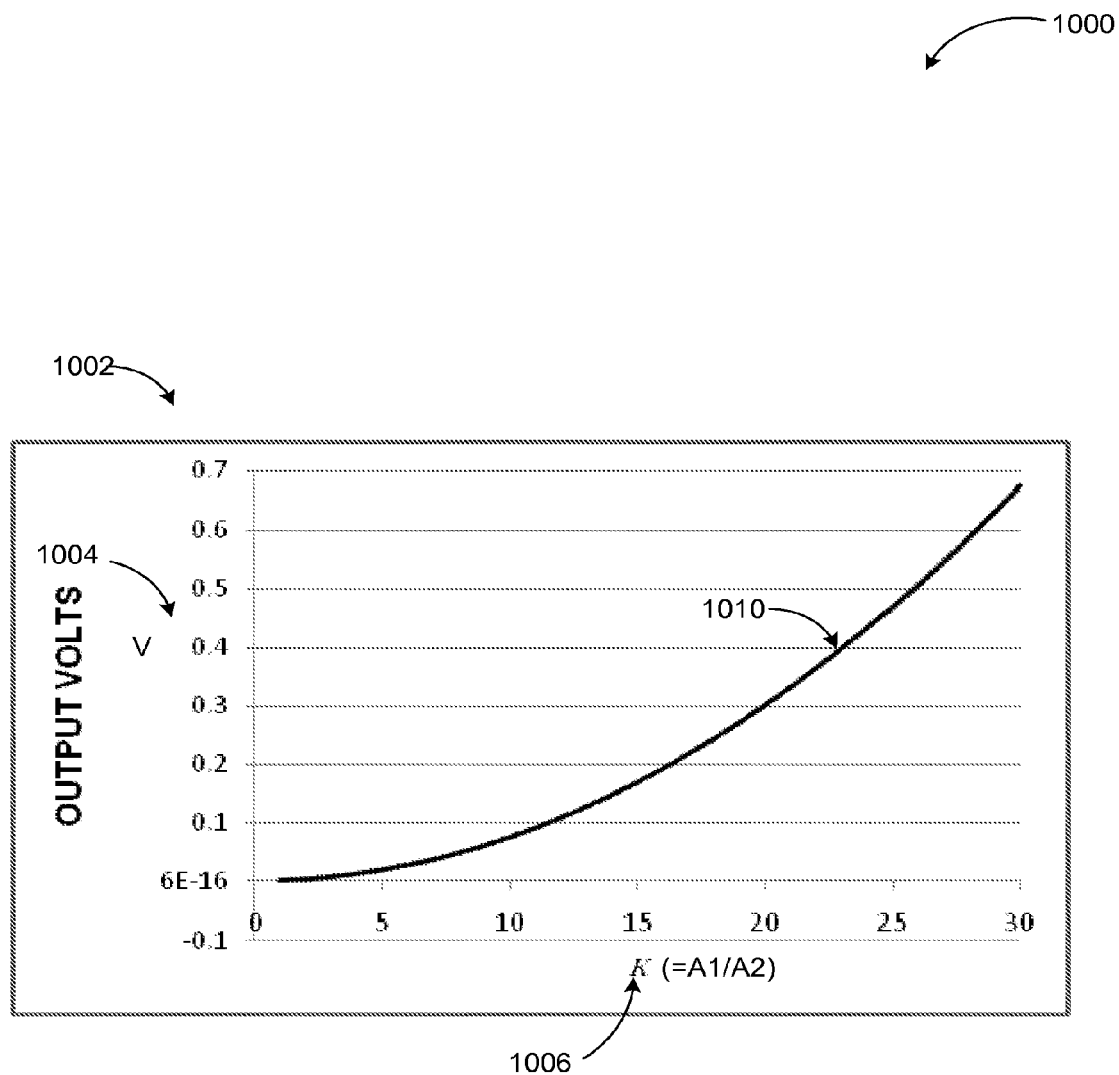
FIG. 10 illustrates an example graph of generated voltage against the ratio of the entry channel area to the inner channel area of a wind energy harnessing component.

FIG. 10 illustrates an example graph of generated voltage against the ratio of the entry channel area to the inner channel area of a wind energy harnessing component, arranged in accordance with at least some embodiments described herein. The graph 1002 in diagram 1000 illustrates a plot 1010 of an induced voltage, V(t) 1004, in a single wind energy harnessing component against the ratio (K 1006) of the entry channel surface area $A_1$, to the inner channel surface area $A_2$, using the following approximate practical values: $v_1$=10 km/hour input wind speed, S=3.1416 cm$^2$ (where the diameter of the coil=2 cm), N=100 coil windings, $B_o$=0.25 Tesla (a normal NeFeB magnet), R=1%, and f=5 membrane vibrations per second. As demonstrated by the plot 1010, if the inner channel surface area is 1 cm$^2$, then the maximum region of this plot shows that an entry channel having a surface area of 30 cm$^2$, or approximately a 6.1 cm diameter, can produce approximately 0.7 V.

In an example embodiment with these approximate practical values, a wall populated with a plurality of wind energy harnessing components may produce a relatively large voltage. For example a 2 m×4 m wall may be populated with 200 wind energy harnessing components spaced 20 cm apart, and such a wall may be capable of generating 140 volts if the wind energy harnessing components are connected in series. The wind energy harnessing components may be connected to an external power grid by connecting wires for harnessing the generated voltage, and the power generation available (P=IV) may be a function of the conducting coils on the plurality of wind energy harnessing components and connecting wire resistance.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 11:
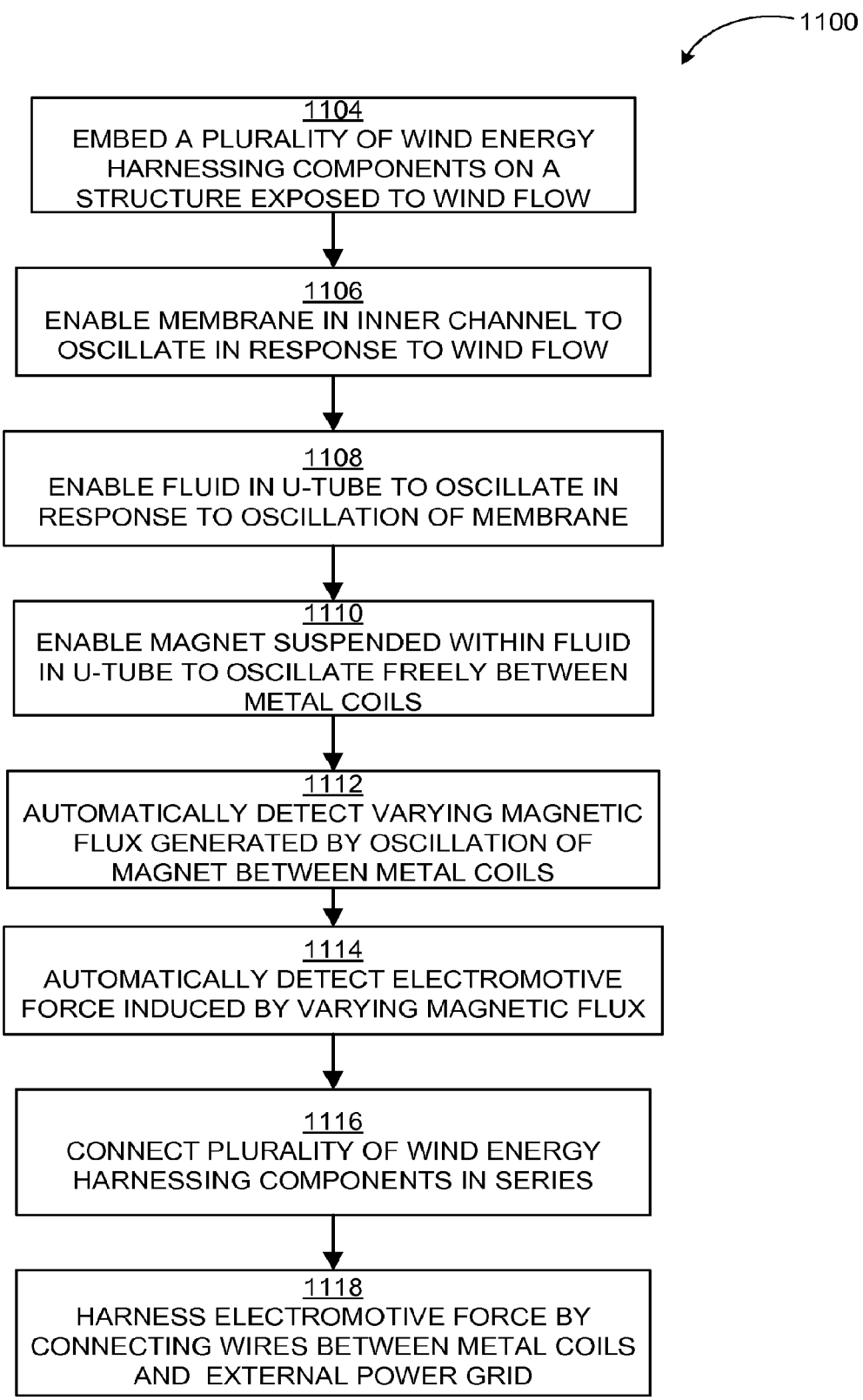
FIG. 11 is a flow diagram illustrating an example method for converting wind energy into electrical energy through a structure embedded with a plurality wind energy harnessing components, all arranged in accordance with at least some embodiments described herein.

FIG. 11 is a flow diagram illustrating an example method for converting wind energy into electrical energy through a structure embedded with a plurality of wind energy harnessing components, arranged in accordance with at least some embodiments described herein. Example methods may include one or more operations, functions or actions as illustrated by one or more of blocks 1104, 1106, 1108, 1110, 1112, 1114, 1116 and/or 1118. The operations described in blocks 1104 through 1118 may also be stored as computer-executable instructions in a computer-readable medium.

A process of converting wind energy into electrical energy through a structure embedded with a plurality of wind energy harnessing components may begin with block 1104, "EMBED A PLURALITY OF WIND ENERGY HARNESSING COMPONENTS ON A STRUCTURE EXPOSED TO WIND FLOW". At block 1122, one or more wind energy harnessing components may be individually attached to a building structure, or may be attached to a lightweight panel which may be attachable to a separate building structure such as a wall, building or other similar structure. The wind energy harnessing component may also be embedded within a wall structure during construction of the wall structure, such that the wind energy harnessing component is constructed as a permanent component of the wall structure, or may be embedded within a pre-fabricated wall structure component, such that the wind energy harnessing component is formed within the pre-fabricated wall structure as a cavity within the building material of the pre-fabricated wall structure and the building material of the pre-fabricated wall structure may form the external housing of the wind energy harnessing component.

Block 1104 may be followed by block 1106, "ENABLE MEMBRANE IN INNER CHANNEL TO OSCILLATE IN RESPONSE TO WIND FLOW." At block 1106, a membrane may be attached on the interior surface of an inner channel of a hollow tube of the wind energy harnessing component. The membrane may be perforated with a series of holes to allow air to flow across the membrane such that the membrane may oscillate with an incoming air flow from an entry channel to the inner channel.

Block 1106 may be followed by block 1108, "ENABLE FLUID IN U-TUBE TO OSCILLATE IN RESPONSE TO OSCILLATION OF MEMBRANE." At block 1108, the oscillations of the membrane due to the incoming air flow may cause the inner channel surface area to oscillate, and as a result, fluid within an attached curved tube, or u-tube, may correspondingly oscillate.

Block 1108 may be followed by block 1110, "ENABLE MAGNET SUSPENDED WITHIN FLUID IN U-TUBE TO OSCILLATE FREELY BETWEEN CONDUCTING COILS." At block 1110, a magnet may be inserted within the fluid inside the attached curved tube and conducting coils may be wound around the exterior surface of the attached curved tube. The magnet may be enabled to move freely with the fluid as it oscillates within the curved tube between the conducting coils in response to the pressure differential between the entry channel and inner channel.

Block 1110 may be followed by block 1112, "AUTOMATICALLY DETECT VARYING MAGNETIC FLUX GENERATED BY OSCILLATION OF MAGNET BETWEEN CONDUCTING COILS." At block 1112, a magnetic flux may be generated by the translation of the magnet between the conducting coils wound around the exterior of the attached curved tube.

Block 1112 may be followed by block 1114, "AUTOMATICALLY DETECT ELECTROMOTIVE FORCE INDUCED BY VARYING MAGNETIC FLUX." At block 1114 a voltage may be induced in the conducting coils by the time varying magnetic flux of the oscillating magnet within the attached curved tube.

Block 1114 may be followed by block 1116, "CONNECT PLURALITY OF WIND ENERGY HARNESSING COMPONENTS IN SERIES." At block 1116, one or more wind energy harnessing components may be connected in series on a building structure such as a wall to increase the voltage generated by the wind energy harnessing components.

Block 1116 may be followed by block 1118, "HARNESS ELECTROMOTIVE FORCE BY CONNECTING WIRES BETWEEN CONDUCTING COILS AND EXTERNAL POWER GRID." At block 1118, the conducting coils on each wind energy harnessing component may be attached to wires which may collect the generated current and voltage, and may provide the current and voltage to an external power grid for harnessing and converting the generated voltage into usable electrical energy.

The blocks included in the above described process are for illustration purposes. Capturing and converting wind energy to electrical energy utilizing a wind energy harnessing device may be implemented by similar processes with fewer or additional blocks. In some examples, the blocks may be performed in a different order. In some other examples, various blocks may be eliminated. In still other examples, various blocks may be divided into additional blocks, or combined together into fewer blocks.

While embodiments have been discussed above using specific examples, components, and configurations, they are intended to provide a general guideline to be used for capturing and converting wind energy to electrical energy utilizing a wind energy harnessing device. These examples do not constitute a limitation on the embodiments, which may be implemented using other components, modules, and configurations using the principles described herein. Furthermore, actions discussed above may be performed in various orders, especially in an interlaced fashion.

According to some example embodiments, a wind energy harnessing device may include a hollow tube including an intake portion, an outtake portion, and a tapered portion with an inner channel, where the intake portion of the hollow tube has a first diameter, the inner channel has a second diameter, and the outtake portion has a third diameter, where the tapered portion has a first tapered shape with changing diameter extending from the intake portion to the inner channel of the hollow tube and a second tapered shape with changing diameter extending from the inner channel to the outtake portion of the hollow tube; a permeable element affixed transversally in the inner channel and configured such that the permeable element oscillates in response to air passing through the hollow tube; a bent tube including a first end and a second end, where the substantially bent tube is partially filled with a fluid, where the first end is coupled to the air intake portion of the hollow tube and the second end is coupled to the inner channel behind the permeable element such that the fluid moves bi-directionally within the bent tube in response to the oscillation of the permeable element; a magnet suspended within the fluid inside the bent tube, where the magnet is configured to move within the fluid in response to the bi-directional movement of the fluid; and a conductive coil wrapped around an exterior surface of the bent tube, where the conductive coil is configured such that an electric current is generated in response to a movement of the magnet through the conductive coil.

According to other examples, the bent tube may be substantially u-shaped. The hollow tube may be constructed of a material including one or more of: plastic, metal, and/or fiberglass. The wind energy harnessing device may be embedded within a wall structure during a construction. The wind energy harnessing device may be embedded within a pre-fabricated wall structure component. The permeable element may be composed of at least one of: plastic, rubber, metal, and/or fiberglass. The permeable element may also be perforated with a plurality of openings to allow airflow. The permeable element may further be affixed to an interior of the inner channel at two locations and configured to oscillate upon an impact of airflow.

According to further examples, a cross-sectional shape of the permeable element may approximately match an interior shape of the inner channel. A size, a shape, a number of openings, and/or a material of the permeable element may be selected to facilitate oscillation of the permeable element at an optimal resonant frequency in response to impact from air flow. The fluid inside the bent tube may be water. The magnet may be encapsulated in a material having surface tension properties approximately coincides with an interior surface of the bent tube to allow the magnet to move within the bent tube. The material encapsulating the magnet may be hydrophobic. And, a shape and a size of the magnet may be selected to approximately correspond to an interior shape and size of the bent tube to create a moderate seal with an interior surface of the bent tube while allowing the magnet to move within the bent tube.

According to other example embodiments, a wind energy harnessing wall may include a wall structure having a first surface and a second surface and a plurality of wind energy harnessing devices embedded into the wall structure with an air intake opening of each device being on the first surface of the wall structure and an output opening of each device being on the second surface of the wall structure. Each device may include a hollow tube including an intake portion, an outtake portion, and a tapered portion with an inner channel, where the intake portion of the hollow tube has a first diameter, the inner channel has a second diameter, and the outtake portion has a third diameter, where the tapered portion has a first tapered shape with changing diameter extending from the intake portion to the inner channel of the hollow tube and a second tapered shape with changing diameter extending from the inner channel to the outtake portion of the hollow tube; a permeable element affixed transversally in the inner channel and configured such that the permeable element oscillates in response to air passing through the hollow tube; a bent tube including a first end and a second end, where the substantially bent tube is partially filled with a fluid, where the first end is coupled to the air intake portion of the hollow tube and the second end is coupled to the inner channel behind the permeable element such that the fluid moves bi-directionally within the bent tube in response to the oscillation of the permeable element; a magnet suspended within the fluid inside the bent tube, where the magnet is configured to move within the fluid in response to the bi-directional movement of the fluid; and a conductive coil wrapped around an exterior surface of the bent tube, where the conductive coil is configured such that an electric current is generated in response to a movement of the magnet through the conductive coil.

According to yet other examples, the bent tube may be substantially u-shaped. The hollow tube may be constructed of a material including one or more of: plastic, metal, and/or fiberglass. The wind energy harnessing device may be embedded within a wall structure during a construction. The wind energy harnessing device may be embedded within a pre-fabricated wall structure component. The permeable element may be composed of at least one of: plastic, rubber, metal, and/or fiberglass. The permeable element may also be perforated with a plurality of openings to allow airflow. The permeable element may further be affixed to an interior of the inner channel at two locations and configured to oscillate upon an impact of airflow.

According to yet further examples, a cross-sectional shape of the permeable element may approximately match an interior shape of the inner channel. A size, a shape, a number of openings, and/or a material of the permeable element may be selected to facilitate oscillation of the permeable element at an optimal resonant frequency in response to impact from air flow. The fluid inside the bent tube may be water. The magnet may be encapsulated in a material having surface tension properties approximately coincides with an interior surface of the bent tube to allow the magnet to move within the bent tube. The material encapsulating the magnet may be hydrophobic. And, a shape and a size of the magnet may be selected to approximately correspond to an interior shape and size of the bent tube to create a moderate seal with an interior surface of the bent tube while allowing the magnet to move within the bent tube.

According to further example embodiments, a method for converting wind energy into electrical energy through a plurality of wind energy harnessing devices embedded into a wall structure may include embedding the plurality of wind energy harnessing devices into the wall structure with an air intake opening of each device being on an external surface of the wall structure and an output opening of each device being on a surface of the wall structure opposite of the external surface. Each device may include a hollow tube including an intake portion, an outtake portion, and a tapered portion with an inner channel, where the intake portion of the hollow tube has a first diameter, the inner channel has a second diameter, and the outtake portion has a third diameter, where the tapered portion has a first tapered shape with changing diameter extending from the intake portion to the inner channel of the hollow tube and a second tapered shape with changing diameter extending from the inner channel to the outtake portion of the hollow tube; a permeable element affixed transversally in the inner channel and configured such that the permeable element oscillates in response to air passing through the hollow tube; a bent tube including a first end and a second end, where the substantially bent tube is partially filled with a fluid, where the first end is coupled to the air intake portion of the hollow tube and the second end is coupled to the inner channel behind the permeable element such that the fluid moves bi-directionally within the bent tube in response to the oscillation of the permeable element; a magnet suspended within the fluid inside the bent tube, where the magnet is configured to move within the fluid in response to the bi-directional movement of the fluid; and a conductive coil wrapped around an exterior surface of the bent tube, where the conductive coil is configured such that an electric current is generated in response to a movement of the magnet through the conductive coil.

According to other examples, the method may further include exposing the external surface of the wall structure to wind; dynamically positioning the wind energy harnessing devices to maximize an incoming air flow to the wind energy harnessing devices; enabling the permeable element to oscillate in response to the incoming air flow; enabling the fluid in the bent tube to move bi-directionally in response to the oscillation of the permeable element; enabling the magnet suspended within the fluid inside the bent tube to move in response to the bi-directional movement of the fluid; and harvesting the electric current generated between the terminals of the conductive coil in response to the movement of the magnet through the at least one conductive coil. The method may also include providing the harvested electric current to an external power grid.

According to yet other example embodiments, a wind energy harnessing wall module may include a prefabricated panel, configured to be attached to a preexisting structure and a plurality of wind energy harnessing devices embedded into the prefabricated panel with an air intake opening of each device being on the first surface of the prefabricated panel and an output opening of each device being on the second surface of the prefabricated panel. Each device may include a hollow tube including an intake portion, an outtake portion, and a tapered portion with an inner channel, where the intake portion of the hollow tube has a first diameter, the inner channel has a second diameter, and the outtake portion has a third diameter, where the tapered portion has a first tapered shape with changing diameter extending from the intake portion to the inner channel of the hollow tube and a second tapered shape with changing diameter extending from the inner channel to the outtake portion of the hollow tube; a permeable element affixed transversally in the inner channel and configured such that the permeable element oscillates in response to air passing through the hollow tube; a bent tube including a first end and a second end, where the substantially bent tube is partially filled with a fluid, where the first end is coupled to the air intake portion of the hollow tube and the second end is coupled to the inner channel behind the permeable element such that the fluid moves bi-directionally within the bent tube in response to the oscillation of the permeable element; a magnet suspended within the fluid inside the bent tube, where the magnet is configured to move within the fluid in response to the bi-directional movement of the fluid; and a conductive coil wrapped around an exterior surface of the bent tube, where the conductive coil is configured such that an electric current is generated in response to a movement of the magnet through the conductive coil.

According to further examples, the prefabricated panel may be constructed from a lightweight material, including one or more of: a fabric, a plastic, a sheet metal, nylon, and fiberglass. The prefabricated panel may be supported within a housing frame, and the housing frame may be configured to be secured to an external surface of a preexisting structure. Wind energy harnessing devices may be affixed to the prefabricated panel in a movable fashion such that the device are dynamically re-positionable to maximize an incoming air flow to the wind energy harnessing devices.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A wind energy harnessing device comprising:
a hollow tube including an intake portion, an outtake portion, and a tapered portion with an inner channel, wherein the intake portion of the hollow tube has a first diameter, the inner channel has a second diameter, and the outtake portion has a third diameter, wherein the tapered portion has a first tapered shape with changing diameter extending from the intake portion to the inner channel of the hollow tube and a second tapered shape with changing diameter extending from the inner channel to the outtake portion of the hollow tube;

a permeable element affixed transversally in the inner channel and configured such that the permeable element oscillates in response to air passing through the hollow tube;

a bent tube including a first end and a second end, wherein the substantially bent tube is partially filled with a fluid, wherein the first end is coupled to the air intake portion of the hollow tube and the second end is coupled to the inner channel behind the permeable element such that the fluid moves bi-directionally within the bent tube in response to the oscillation of the permeable element;

a magnet suspended within the fluid inside the bent tube, wherein the magnet is configured to move within the fluid in response to the bi-directional movement of the fluid; and a conductive coil wrapped around an exterior surface of the bent tube, wherein the conductive coil is configured such that an electric current is generated in response to a movement of the magnet through the conductive coil.

2. The wind energy harnessing device of claim 1, wherein the bent tube is substantially u-shaped.

3. The wind energy harnessing device of claim 1, wherein the hollow tube is constructed of a material including one or more of: plastic, metal, and/or fiberglass.

4. The wind energy harnessing device of claim 1, wherein the wind energy harnessing device is embedded within a wall structure during a construction.

5. The wind energy harnessing device of claim 1, wherein the wind energy harnessing device is embedded within a pre-fabricated wall structure component.

6. The wind energy harnessing device of claim 1, wherein the permeable element is composed of at least one of: plastic, rubber, metal, and/or fiberglass.

7. The wind energy harnessing device of claim 1, wherein the permeable element is perforated with a plurality of openings to allow airflow.

8. The wind energy harnessing device of claim 1, wherein the permeable element is affixed to an interior of the inner channel at two locations and is configured to freely oscillate upon an impact of airflow.

9. The wind energy harnessing device of claim 1, wherein a cross-sectional shape of the permeable element approximately matches an interior shape of the inner channel.

10. A wind energy harnessing wall, comprising:

a wall structure having a first surface and a second surface;

a plurality of wind energy harnessing devices embedded into the wall structure with an air intake opening of each device being on the first surface of the wall structure and an output opening of each device being on the second surface of the wall structure, wherein each device comprises:

a hollow tube including an intake portion, an outtake portion, and a tapered portion with an inner channel, wherein the intake portion of the hollow tube has a first diameter, the inner channel has a second diameter, and the outtake portion has a third diameter, wherein the tapered portion has a first tapered shape with changing diameter extending from the intake portion to the inner channel of the hollow tube and a second tapered shape with changing diameter extending from the inner channel to the outtake portion of the hollow tube;

a permeable element affixed transversally in the inner channel and configured such that the permeable element oscillates in response to air passing through the hollow tube;

a bent tube including a first end and a second end, wherein the substantially bent tube is partially filled with a fluid, wherein the first end is coupled to the air intake portion of the hollow tube and the second end is coupled to the inner channel behind the permeable element such that the fluid moves bi-directionally within the bent tube in response to the oscillation of the permeable element;

a magnet suspended within the fluid inside the bent tube, wherein the magnet is configured to move within the fluid in response to the bi-directional movement of the fluid; and a conductive coil wrapped around an exterior surface of the bent tube, wherein the conductive coil is configured such that an electric current is generated in response to a movement of the magnet through the conductive coil.

11. The wind energy harnessing wall of claim 10, wherein the permeable element is perforated with a plurality of openings to allow airflow.

12. The wind energy harnessing wall of claim 10, wherein the permeable element is affixed to an interior of the inner channel at one location and is configured to freely oscillate upon an impact of airflow.

13. The wind energy harnessing wall of claim 10, wherein the permeable element is affixed to an interior of the inner channel at two locations and is configured to freely oscillate upon an impact of airflow.

14. The wind energy harnessing wall of claim 10, wherein the fluid inside the bent tube is water.

15. The wind energy harnessing wall of claim 10, wherein the magnet is encapsulated in a material having surface tension properties approximately coincides with an interior surface of the bent tube to allow the magnet to move within the bent tube.

16. The wind energy harnessing wall of claim 15, wherein the material encapsulating the magnet is hydrophobic.

17. The wind energy harnessing wall of claim 10, wherein a shape and a size of the magnet are selected to approximately correspond to an interior shape and size of the bent tube to create a moderate seal with an interior surface of the bent tube while allowing the magnet to move within the bent tube.

18. A method for converting wind energy into electrical energy through a plurality of wind energy harnessing devices embedded into a wall structure, the method comprising:

embedding the plurality of wind energy harnessing devices into the wall structure with an air intake opening of each device being on an external surface of the wall structure and an output opening of each device being on a surface of the wall structure opposite of the external surface, wherein each device comprises:

a hollow tube including an intake portion, an outtake portion, and a tapered portion with an inner channel, wherein the intake portion of the hollow tube has a first diameter, the inner channel has a second diameter, and the outtake portion has a third diameter, wherein the tapered portion has a first tapered shape with changing diameter extending from the intake portion to the inner channel of the hollow tube and a second tapered shape with changing diameter extending from the inner channel to the outtake portion of the hollow tube;

a permeable element affixed transversally in the inner channel and configured such that the permeable element oscillates in response to air passing through the hollow tube;

a bent tube including a first end and a second end, wherein the substantially bent tube is partially filled with a fluid, wherein the first end is coupled to the air intake portion of the hollow tube and the second end is coupled to the inner channel behind the permeable element such that the fluid moves bi-directionally within the bent tube in response to the oscillation of the permeable element;

a magnet suspended within the fluid inside the bent tube, wherein the magnet is configured to move within the fluid in response to the bi-directional movement of the fluid; and a conductive coil wrapped around an exterior surface of the bent tube, wherein the conductive coil is configured such that an electric current is generated in response to a movement of the magnet through the conductive coil.

19. The method of claim 18, further comprising:
exposing the external surface of the wall structure to wind;
dynamically positioning the wind energy harnessing devices to maximize an incoming air flow to the wind energy harnessing devices;
enabling the permeable element to oscillate in response to the incoming air flow;
enabling the fluid in the bent tube to move bi-directionally in response to the oscillation of the permeable element;
enabling the magnet suspended within the fluid inside the bent tube to move in response to the bi-directional movement of the fluid; and
harvesting the electric current generated between the terminals of the conductive coil in response to the movement of the magnet through the at least one conductive coil.

20. The method of claim 19, further comprising:
providing the harvested electric current to an external power grid.

* * * * *

UNITED STATES PATENT AND TRADEMARK OFFICE
CERTIFICATE OF CORRECTION

PATENT NO. : 8,890,354 B2
APPLICATION NO. : 13/814996
DATED : November 18, 2014
INVENTOR(S) : Casasanta, III Page 1 of 2

It is certified that error appears in the above-identified patent and that said Letters Patent is hereby corrected as shown below:

In the Specification

In Column 1, Below Title, insert -- CROSS-REFERENCE TO RELATED APPLICATION
The present application is a U.S. national stage filing under 35 U.S.C. §371 of International Application No. PCT/US2012/036138, filed on May 2, 2012. --.

In Column 4, Line 1, delete "illustrates" and insert -- illustrates an --, therefor.

In Column 6, Line 8, delete "thus the the" and insert -- thus the height difference 120 in the u-tube manometer 122 to modulate, such that work is done as the fluid moves. FIG. 2 illustrates an example entry channel and inner channel including an attached membrane of an example wind energy harnessing component, arranged in accordance with at least some embodiments described herein. In order to enable a wind energy harnessing device to capture and convert wind energy into electrical energy by taking advantage of the Venturi effect, a hollow tube, such as a Venturi tube, may be configured to enable static conditions to be alterable such that work can be performed and energy can be harnessed. As shown in diagram 200, a membrane 206 may be attached (208) on the interior of the inner channel 213 for enabling conditions affecting the Venturi tube to be alterable. The membrane 206 may be enabled to oscillate with an incoming air flow from the entry channel 210 to the inner channel 213. The oscillations of the membrane 206 due to the incoming air flow may cause the inner channel surface area 204 to oscillate and as a result, the height differential in an attached curved tube, or u-tube manometer, may correspondingly oscillate.
In an example embodiment, the membrane 206 may be perforated with a series of holes to allow air to flow across the membrane 206, and the profile and shape of the membrane 206 may be configured to match the interior profile and shape of the inner channel 213 such that the surface area of the membrane substantially equals the inner channel surface area 204. Additionally, as will be described in more detail below, a magnet may be encapsulated in a u-tube manometer which may be attached to the hollow tube as described above in conjunction with FIG. 1.

Signed and Sealed this
First Day of September, 2015

Michelle K. Lee
*Director of the United States Patent and Trademark Office*

Col. 6 - Cont'd.
The energy that may be harnessed from the wind energy harnessing component due to the addition of the oscillating membrane 206 may be demonstrated as follows:
As air enters the entry channel and flows through the inner channel 213, the membrane 206 may go into forced harmonic oscillation at a resonant frequency (f). The resonant frequency (f) of the oscillating membrane 206 may depend on dimensions, boundary conditions, and elastic modulus of the material of the membrane 206. The resonant frequency (f) of the membrane can be calculated from the --, therefor.

In Column 10, Lines 65-66, delete "and or" and insert -- and/or --, therefor.

In Column 18, Lines 26-27, delete "hydrophobic. And," and insert -- hydrophobic and --, therefor.

In Column 20, Line 30, delete "and or" and insert -- and/or --, therefor.